United States Patent

Miyadera et al.

(10) Patent No.: US 8,721,192 B2
(45) Date of Patent: May 13, 2014

(54) OPTICAL CONNECTING STRUCTURE

(75) Inventors: Nobuo Miyadera, Tsukuba (JP);
Toshihiro Kuroda, Tsukuba (JP);
Shigeru Koibuchi, Tsukuba (JP);
Kyouichi Sasaki, Shizuoka (JP)

(73) Assignee: Hitachi Chemical Co., Ltd., Tokyo (JP)

( * ) Notice: Subject to any disclaimer, the term of this patent is extended or adjusted under 35 U.S.C. 154(b) by 690 days.

(21) Appl. No.: 12/742,728

(22) PCT Filed: Nov. 14, 2008

(86) PCT No.: PCT/JP2008/003332
§ 371 (c)(1),
(2), (4) Date: Aug. 23, 2010

(87) PCT Pub. No.: WO2009/063649
PCT Pub. Date: May 22, 2009

(65) Prior Publication Data
US 2010/0310214 A1  Dec. 9, 2010

(30) Foreign Application Priority Data

Nov. 15, 2007 (JP) .................................. 2007-296894

(51) Int. Cl.
*G02B 6/36* (2006.01)

(52) U.S. Cl.
USPC ................... 385/91; 385/14; 385/15; 385/55; 385/58; 385/69; 385/70; 385/73; 385/75; 385/77; 385/88; 385/89; 385/90; 385/92; 385/93; 385/94

(58) Field of Classification Search
USPC ........... 385/14–15, 55, 58, 69, 70, 73, 75, 77, 385/88–94
See application file for complete search history.

(56) References Cited

U.S. PATENT DOCUMENTS 3,963,323 A * 6/1976 Arnold ............................ 385/62
5,896,481 A * 4/1999 Beranek et al. ................. 385/90
(Continued)

FOREIGN PATENT DOCUMENTS

EP    1 686402     8/2006
JP    07-013038   1/1995
(Continued)

OTHER PUBLICATIONS

International Search Report of International Appln. PCT/JP2008/003332 dated Dec. 22, 2008 in English.

(Continued)

*Primary Examiner* — Charlie Peng
*Assistant Examiner* — Guy Anderson
(74) *Attorney, Agent, or Firm* — Antonelli, Terry, Stout & Kraus, LLP.

(57) ABSTRACT

An optical connecting structure has an optical fiber, a pressing member having a circular outer cross section, and an optical member, wherein the optical member has an optical element, an optical fiber stopper structure, and an optical fiber holding groove, wherein the optical fiber stopper structure is positioned between the optical element and the optical fiber holding groove, wherein the optical fiber is inserted along the optical fiber holding groove so as to contact with the optical fiber stopper structure, and wherein the pressing member is arranged on the optical fiber holding groove mutually perpendicular, the pressing member presses the upper surface of the optical fiber to a direction of a bottom of the optical fiber holding groove, and the optical fiber and the optical element are thereby optically connected.

13 Claims, 21 Drawing Sheets

(56) References Cited

U.S. PATENT DOCUMENTS

| | | | | |
|---|---|---|---|---|
| 5,905,831 | A * | 5/1999 | Boudreau et al. | 385/88 |
| 5,909,523 | A * | 6/1999 | Sakaino et al. | 385/49 |
| 5,911,021 | A * | 6/1999 | MacDonald et al. | 385/35 |
| 6,739,764 | B2 * | 5/2004 | Ido et al. | 385/92 |
| 6,879,757 | B1 * | 4/2005 | Zhou et al. | 385/49 |
| 6,898,029 | B2 * | 5/2005 | Steinberg et al. | 359/819 |
| 2002/0131727 | A1 * | 9/2002 | Reedy et al. | 385/88 |
| 2003/0223707 | A1 * | 12/2003 | Nakanishi et al. | 385/92 |
| 2004/0114884 | A1 * | 6/2004 | Shinde et al. | 385/94 |
| 2004/0131318 | A1 * | 7/2004 | Mori et al. | 385/92 |
| 2005/0157972 | A1 * | 7/2005 | Kuhara et al. | 385/14 |
| 2005/0180701 | A1 * | 8/2005 | Steinberg et al. | 385/92 |
| 2005/0226566 | A1 | 10/2005 | Sasaki et al. | |
| 2007/0086707 | A1 | 4/2007 | Suzuki et al. | |

FOREIGN PATENT DOCUMENTS

| | | |
|---|---|---|
| JP | 07-234335 | 9/1995 |
| JP | 08-015539 | 1/1996 |
| JP | 08-286073 | 11/1996 |
| JP | 2531028 | 1/1997 |
| JP | 11-281851 | 10/1999 |
| JP | 2000-035526 | 2/2000 |
| JP | 2000-105322 | 4/2000 |
| JP | 2001-281479 | 10/2001 |
| JP | 2002-122751 | 4/2002 |
| JP | 2004-138725 | 5/2004 |
| JP | 2005-181737 | 7/2005 |
| JP | 2005-283740 | 10/2005 |
| JP | 2005-338263 | 12/2005 |
| JP | 2006-184752 | 7/2006 |

OTHER PUBLICATIONS

EP Search Report of Appln.No. 08849454.7 dated Jun. 6, 2012 in English.

* cited by examiner

OPTICAL CONNECTING STRUCTURE

TECHNICAL FIELD

The present invention relates to an optical connecting structure for connecting an optical fiber and an optical member.

BACKGROUND ART

Conventionally, as an optical connecting structure that connects an optical fiber and an optical member, a package for an optical waveguide substrate, which can pack an optical waveguide and an optical fiber together, has been used (See references 1 and 2 below). The package disclosed in the reference 1 has a structure in which a groove having a V-shape for aligning the optical fiber at a lower part of the package and a convex part having a V-shape for pressing the optical fiber at an upper part of the package, are arranged. When assembling this package, the optical waveguide substrate is aligned at the lower part of the package, and by aligning the optical fiber at the groove of a lower part of the package, the optical waveguide substrate and the optical fiber are aligned with each other. Subsequently, the optical fiber is arranged between the groove at the lower part of the package and the convex part at the upper part of the package to fix itself. Furthermore, the reference 2 discloses a metallic package in which resin is filled therein. In this package, breaking of the optical fiber by a tension acts on the optical fiber fixed on the optical waveguide substrate, and reduction of adhering characteristics of the adhesive by surrounding moisture can be controlled.

However, although assembling of the package is relatively easy in the reference 1, it is necessary that an optical element such as the optical waveguide substrate installed in the lower part of the package be aligned to the V-shaped groove of the lower part of the package with high accuracy (within about ±1 µm). Therefore, it is desirable that a packaging apparatus be used; however, such packaging apparatuses are very expensive, in practice about ¥20,000,000 to ¥30,000,000. In addition, since the optical fiber is fixed by pressing the optical fiber around an edge part of the package, breaking may easily occur at that position. Furthermore, in the package disclosed in the reference 2, it is difficult to align the optical waveguide substrate in the package.

It is known that accurate aligning of the optical axis of the optical fiber along the vertical direction can be performed by arranging the optical fiber along an optical fiber holding groove. It should be noted that, hereinafter, the upper-lower direction of the vertical direction of the optical axis, that is, a direction to the bottom of the optical fiber holding groove is defined as the y direction, the left-right direction is defined as the x direction, and the axis direction of the optical axis is defined as the z direction. As the optical fiber holding groove, a structure in which the cross section is shaped like the letter V, a so-called V groove, is used in many cases (See reference 3). The reference 3 discloses an optical waveguide substrate in which the V groove is used as the optical fiber holding groove to connect the optical waveguide and optical fiber. By this optical waveguide substrate, since the V groove and the optical waveguide are integrated on a single substrate, efficient connection can be provided even in the case of connection of the optical waveguide with a single mode optical fiber, which requires more accuracy than a connection with a multimode optical fiber.

However, to practically provide such an optical waveguide part, it is necessary that a so-called pigtail type package, in which the optical fiber is arranged at the optical waveguide, be realized. To realize this, the optical fiber is required to be mounted on the V groove with high accuracy. Therefore, conventionally, while observing the optical fiber and the edge surface of the optical waveguide by using an aligning apparatus equipped with a microscope or the like, the optical fiber is arranged on the V groove with the aligning of the optical fiber along the x direction, the y direction, and the z direction on a precise positioning stage or the like. Then, by arranging a glass block or the like on the optical fiber and pressing the glass block, final alignment along the x direction and the y direction is performed. Subsequently, by adhering and fixing it, the optical fiber is mounted. In this way, in the case in which the conventional optical fiber pigtail module is produced, means for aligning the optical fiber by a apparatus such as the precise positioning stage can be employed; however, since the apparatus is too large, it becomes difficult to realize easy optical connecting structure at an actual site at which the optical fiber is laid.

To solve such a problem, much effort has been expended trying to mount the optical fiber on the V groove accurately and easily at low cost. For example, a package including a lower part of the package, an upper part of the package, and a groove for aligning the optical fiber, wherein the optical fiber aligned on the groove for aligning the optical fiber is pressed downwardly by a pressing part arranged on the upper part of the package, is disclosed (See reference 4). In the reference 4, a structure in which an optical waveguide substrate including the groove for aligning the optical fiber such as a V groove arranged on the lower part of the package and the pressing part arranged on the upper part of the package are engaged to press the optical fiber to the V groove and therefore to complete optical connection of the optical waveguide and the optical fiber, is disclosed. By this structure, a part such as glass block or a device such as precise positioning stage can be omitted, and therefore the optical connecting structure may be realized at arbitrarily selected environments in the field of laying optical fiber by improving the workability during aligning of the optical fiber.

However, in the structure according to the reference 4, when the optical fiber is arranged on the V groove before the upper part and the lower part of the package are engaged, alignment along the z direction may be insufficient. That is, there may be a case in which the top of the optical fiber is too far from the edge surface of the optical waveguide, a case in which the optical fiber is too close to the optical waveguide and the fiber rides on the waveguide to break the top or the edge surface thereof, or a case in which the position of the top of the optical fiber is out of alignment.

Furthermore, an optical connecting structure in which the optical connecting position along the axial direction of the optical fiber can be appropriately settled by using an optical fiber holding groove having a structure of which the optical fiber contacts therewith to align the fiber, is disclosed (See reference 5). However, in the optical connecting structure disclosed in the reference 5, since an object of the invention of the reference is to connect an optical fiber and another optical fiber, a position at which the optical fibers contact with each other may be decided relatively, and the position of contact of the fibers may be uncertain against the package.

On the other hand, in many kinds of optical connecting structure, many techniques in which optical fibers are connected with each other as a so-called optical connector, conventionally have been disclosed and used practically. Such an optical connector usually has a structure in which an optical fiber are inserted into an accurate cylindrical element, a so-called ferrule, to be fixed, the ferrule is put in a housing or the like, and such housings are aligned and engaged with each other so that the ferrules therein are faced to each other.

Furthermore, some structures are suggested as an optical connector to connect an optical fiber and a semiconductor device such as an optical waveguide device, a light emitting device, and a light receiving device (See reference 6). To utilize a mechanism for aligning ferrules with each other in the optical connector disclosed in the reference 6, a housing in which an optical element is aligned beforehand and fixed to am opposite side of a connection edge surface of an optical fiber having a ferrule as the optical connector, is prepared, to apply the engaging structure of the optical connector of the optical fiber with each other as a similar engaging structure of the optical fiber and the semiconductor device. In addition, as a purpose for helping the function of aligning of the ferrules with each other, by forming a guide pin and a guide pin hole, respectively, on the housing of the optical fiber connector and the housing of the optical element connector, a structure in which accurate final optical connection can be realized by the two-steps aligning mechanism, is anticipated.

However, such a structure requires an accurate and expensive ferrule, and also requires accurate processing or attaching of the guide pin and guide pinhole on the housing. In addition, since a structure engaging housings with each other and a structure containing various kinds of parts are required, it is necessary that a housing having complicated structure be molded. Therefore, in the overall optical connecting structure, not only is the cost high, but also the overall optical connecting structure is large.

Furthermore, a structure in which a containing structure with a guide pin, guide pin hole, and housing is utilized without using a ferrule, is suggested (See reference 7). Since the structure of the housing in the reference 7 is relatively simple, it is anticipated that production costs can be reduced.

However, the structure of the reference 7 is a structure in which merely the containing structure with the guide pin, guide pin hole, and housing is utilized, and in which an aligning mechanism by an accurate part ferrule is not employed. Therefore, although it can be applied to a plastic optical fiber or a multimode optical fiber having a large core diameter, there may be a problem of variation of connecting loss caused by an insufficient aligning accuracy in the case of butt coupling with a single mode optical fiber or single mode optical waveguide device requiring highly accurate aligning, with a lens requiring highly accurate adjustment of an optical axis, and with a light emitting device such as a laser diode requiring highly accurate aligning.

As a method of realizing such highly accurate aligning, a method using an optical fiber in which a resin coating portion of a common quartz fiber is removed, a so-called bare fiber, and an optical fiber holding groove such as a highly accurately processed V groove, is disclosed (See references 8 and 9). In this case, while pressing the optical fiber from a vertical direction of the optical axis of the optical fiber to the bottom of the V groove, the optical fiber is moved to the bottom direction of the V groove along a side surface of the V shape groove, and the optical fiber is aligned at a predetermined aligning position. Therefore, highly accurate aligning can be finally accomplished even in the case in which the aligning is started from a roughly accurate position of the optical fiber depending on an opening width of the V groove. In this method, the aligning of the vertical direction, that is, the x direction and y direction of the optical axis of the optical fiber is realized at the same time.

In reference 8, a construction of an optical module in which an arc shape groove and a V groove are formed, respectively, on a housing for an optical fiber, called an optical fiber holder and a housing for an optical element called a receptacle, and an optical housing is clipped by these housings from a vertical direction of the axis thereof to accomplish aligning along the x direction and y direction, is disclosed.

Furthermore, in reference 9, a method for connecting an optical module and an optical fiber in which the optical fiber is arranged in advance on a supporting block, a V groove is aligned in advance at an edge surface of an optical waveguide is prepared on the other hand, and this complex of a V groove and an optical waveguide is attached on the optical fiber from a vertical direction of the axis of the optical fiber so that the optical fiber comes into contact with the V groove, to accomplish the aligning of the x direction and y direction, is disclosed.

In these methods for aligning the optical fiber utilizing accurate V groove, although aligning of the vertical direction, that is, the x direction and the y direction of the optical axis of the optical fiber is accomplished at the same time; however, regarding an optical connecting of the axial direction, that is, the z direction of the optical fiber, it is necessary that the length of the optical fiber in the longitudinal direction be prepared in advance at high accuracy to realize highly accurate aligning. For example, in the references 8 and 9, to realize the high accuracy mentioned above, both the optical fiber side and the optical element side are fixed to appropriate housings. Therefore, there may be a problem that highly accurate processing of housing is required to fix it to the appropriate housing in high accuracy, and as a result, a structure of the housing becomes complicated, the number of constituent parts becomes large, and production cost of the optical connecting structure becomes high in its entirety.

Furthermore, arranging in advance the relationship of positions of the optical element or optical fiber and the housing with high accuracy means that high accurate mounting or assembling is required at this step. In some methods, there may be a case in which not only the number of points of optical connecting and the number of constituent parts become unnecessarily large, but also total connecting loss becomes large. Furthermore, since the V groove which has a structure requiring highly accurate aligning is exposed in atmosphere, small foreign matter or the like may contaminate. In the case in which the extraneous material adheres between the optical fiber and side surface of the V groove, there may be a case in which desired high accuracy cannot be obtained and connecting loss is increased.

In reference 10, a construction employs a clamp mechanism to press a V groove and an optical fiber. In addition, a mechanism which improves accuracy in multiple steps by arranging an optical fiber inlet in addition to high accurate aligning means of a V groove or the like, is disclosed. Furthermore, a method in which an optical fiber is inserted and moved to the axial direction (z direction) while keeping the clamping mechanism so that the clamping force does not reach to an optical fiber by a wedge-shaped opening member, and then pullout and position gap of the optical fiber are prevented by removing the opening member and applying the clamp mechanism, is disclosed. In addition, as an aligning method of a tip of the optical fiber along the z direction in which it is inserted, a method by a stopper structure using a gap interface between a bare fiber and a resin coated part, is disclosed.

In the structure of the reference 10, the optical fiber is inserted so as to be arranged on the V groove in a condition in which the clamp mechanism is open; however, at this time, since aligning of the z direction is performed at the gap of the interface of the bare fiber and the resin coated part, in the case in which the length of the bare fiber part is not processed at high accuracy in advance, the top of the optical fiber may be too far from the edge surface of the optical waveguide if the bare fiber part is short. On the other hand, if the bare fiber part is long, the top of the optical fiber is too close to the edge surface of the optical waveguide, and therefore the fiber may ride on the optical waveguide to break the top surface of the optical fiber or the edge surface of the optical waveguide, or the top of the optical fiber may be out of alignment.

Furthermore, in the case in which the pressing force is completely released when the fiber is inserted, as is disclosed in the reference 8, as is mentioned above, the top of the optical fiber may be moved in an unexpected direction during the insertion of the optical fiber. In particular, if the top of the optical fiber is unexpectedly moved upwardly, the fiber cannot be contained in the optical fiber holding groove, and therefore an appropriate optical connecting structure cannot be realized. Such a problem is unlikely to occur in the case in which optical fibers are mutually connected; however, it is a serious problem in the case in which different kind of structures are connected, that is, the optical fiber and the optical waveguide or the like are highly accurately connected. In addition, in a method in which the optical fiber is inserted along the axial direction, like a case in which one whose depth of V groove is relatively shallow, such as when the V groove integrated type optical waveguide is used, in the case in which an optical connection is made with an optical element such that an upper edge part of the optical fiber is higher than that of the optical waveguide is realized, there is a tendency for the top of the optical fiber to ride on the edge surface of the optical waveguide.

Each reference mentioned above is a Japanese Unexamined Patent Application Publication, numbered as follows.
Reference 1: No. Hei07 (1995)-13038
Reference 2: No. Hei08 (1996)-286073
Reference 3: No. 2001-281479
Reference 4: No. 2006-184752
Reference 5: No. 2005-181737
Reference 6: No. 2000-105322
Reference 7: No. Hei07 (1995)-234335
Reference 8: No. Hei11 (1999)-281851
Reference 9: No. 2002-122751
Reference 10: No. 2000-035526

DISCLOSURE OF THE INVENTION

The present invention has been completed in view of the above-mentioned problems, and an object of the present invention is to provide an optical connecting structure and a method for optical connection, in which translational and rotational alignment along the axial direction and all directions perpendicular to the axis of an optical fiber can be realized by a small number of optical connecting points, a small number of constituent parts, and a combination of parts having a simple structure. Furthermore, another object is to provide an optical connecting structure and a method for optical connection, in which connecting of the optical fiber and an optical element such as an optical waveguide can be easily realized by field assembly and not using any devices.

As a result of researching of the structure of the pressing member by the inventors, it has become obvious that the above-mentioned object can be achieved by using an pressing member having a circular outer cross section and by employing an optical connecting structure in which the optical fiber is pressed via this pressing member, and thus the present invention has been completed. That is, the optical connecting structure of the present invention has an optical fiber, a pressing member having a circular outer cross section, and an optical member, wherein the optical member has an optical element, an optical fiber stopper structure, and an optical fiber holding groove, wherein the optical fiber stopper structure is positioned between the optical element and the optical fiber holding groove, wherein the optical fiber is inserted along the optical fiber holding groove so as to contact with the optical fiber stopper structure, and wherein the pressing member is arranged on the optical fiber holding groove mutually perpendicularly, the pressing member presses the upper surface of the optical fiber to a direction of the bottom of the optical fiber holding groove, and therefore the optical fiber and the optical element are optically connected.

Furthermore, another aspect of an optical connecting structure of the present invention has optical fibers, an optical member in which optical fiber holding grooves having a stopper structure of the optical fiber are arranged at both outer edge parts and in which an optical element is arranged on an inner side part of the stopper structure, and pressing members having a circular outer cross section, wherein the optical fiber is inserted along the optical fiber holding groove so as to contact with the stopper structure, and wherein the pressing member is arranged on the optical fiber holding groove mutually perpendicularly, the pressing member presses the upper surface of the optical fiber in a direction of the bottom of the optical fiber holding groove, and therefore the optical fiber and the optical element are optically connected.

Furthermore, a method for optical connection of the present invention is a method to connect an optical connecting precursor structure and an optical fiber, the optical connecting precursor structure has an optical member in which an optical fiber holding groove having a stopper structure of the optical fiber is arranged at both outer edge parts and in which an optical element is arranged on an inner side part of the stopper structure, a pressing member having a circular outer cross section, a pressing member supporting member clipping the pressing member and the optical member, and a package member, wherein the pressing member is arranged perpendicular to the optical fiber holding groove, the method has a step of moving the optical fiber along the optical fiber holding groove to the axial direction of the optical fiber while pressing the upper surface of the optical fiber in a bottom direction of the optical fiber holding groove, to insert the optical fiber to the stopper structure, and a step of clipping the package member and the pressing member supporting member by a clip-shaped member, thereby increasing the pressing force to the pressing member.

By the optical connecting structure of the present invention, since the optical fiber and the pressing member having circular outer cross section are perpendicular to each other, the optical fiber can be pressed by a point contact. Therefore, as shown in FIG. 1, a three-point supporting in the cross section of optical fiber can be realized by a linear contact of the optical fiber and the optical fiber holding groove in addition to the point contact, and therefore a highly accurate alignment can be realized. Since the optical fiber is pressed to the V groove by the pressing member, when the optical fiber and the optical waveguide are connected, while adhesive or the like is applied, highly accurate connection can be accomplished without being out of alignment from the predetermined position. Furthermore, excessive load is not applied to the optical fiber, and therefore it is not damaged. It should be noted that FIG. 1 is a conceptual diagram showing a structural example around the connecting part of the optical fiber, reference numeral 1 is the optical fiber, reference numeral 2 is the optical fiber holding groove, and reference numeral 4 is the pressing member having circular outer cross section. It should be noted that in FIGS. 1, 5 to 8, and 10 to 13, a diagram in which an optical fiber is observed from the side is shown in the left part, and a diagram in which an optical fiber is observed from the axial direction is shown in the right part.

Furthermore, by the method for optical connection of the present invention, connecting of the optical fiber and the optical element such as the optical waveguide can be easily realized without using a device. Therefore, an optical package can be produced at lower cost compared to a conventional optical fiber mounting process. Furthermore, since assembling can be performed at an environment in the field of laying an optical fiber network, a conventional optical fiber connecting process such as optical connecting, mechanical splicing, and fusion splicing are not necessary, and therefore, reduction of the total cost of laying optical fiber communication network is anticipated. Furthermore, the present invention has a more facilitating structure, and the number of production steps is fewer compared to an ordinary connector, and it can be used as an alternative of the conventional connector. In particular, in a case in which many patch cords are inserted and pulled out like a patch panel, the present invention is anticipated, from the viewpoint of reducing space, since an optical connection can be easily obtained at a small size.

EXPLANATION OF REFERENCE NUMERALS

1: Optical fiber, 2: Optical fiber holding groove, 3: Optical member, 4: Pressing member having circular outer cross section, 5: Optical element, 6: Package member, 7: Pressing member supporting member, 8: Optical fiber containing groove, 9: Optical member containing groove, 10: Pressing member containing groove, 11: Optical fiber stopper structure, 12: Clip-shaped member, 13: Adhesive, 14: Cut part, 15: Hole, 16: Fixing member, 17: Cam mechanism, 18: Glass lid, 19: Matching oil, 20: Optical waveguide core, 21: Optical waveguide cladding, 22: Dividing wall, f: Pressing force, H1, H2: Penetrating hole, P: Supporting rod.

DESCRIPTION OF THE PREFERRED EMBODIMENTS

Next, an embodiment of an optical connecting structure according to the present invention will be explained in detail with reference to the figures.

Figure 2:
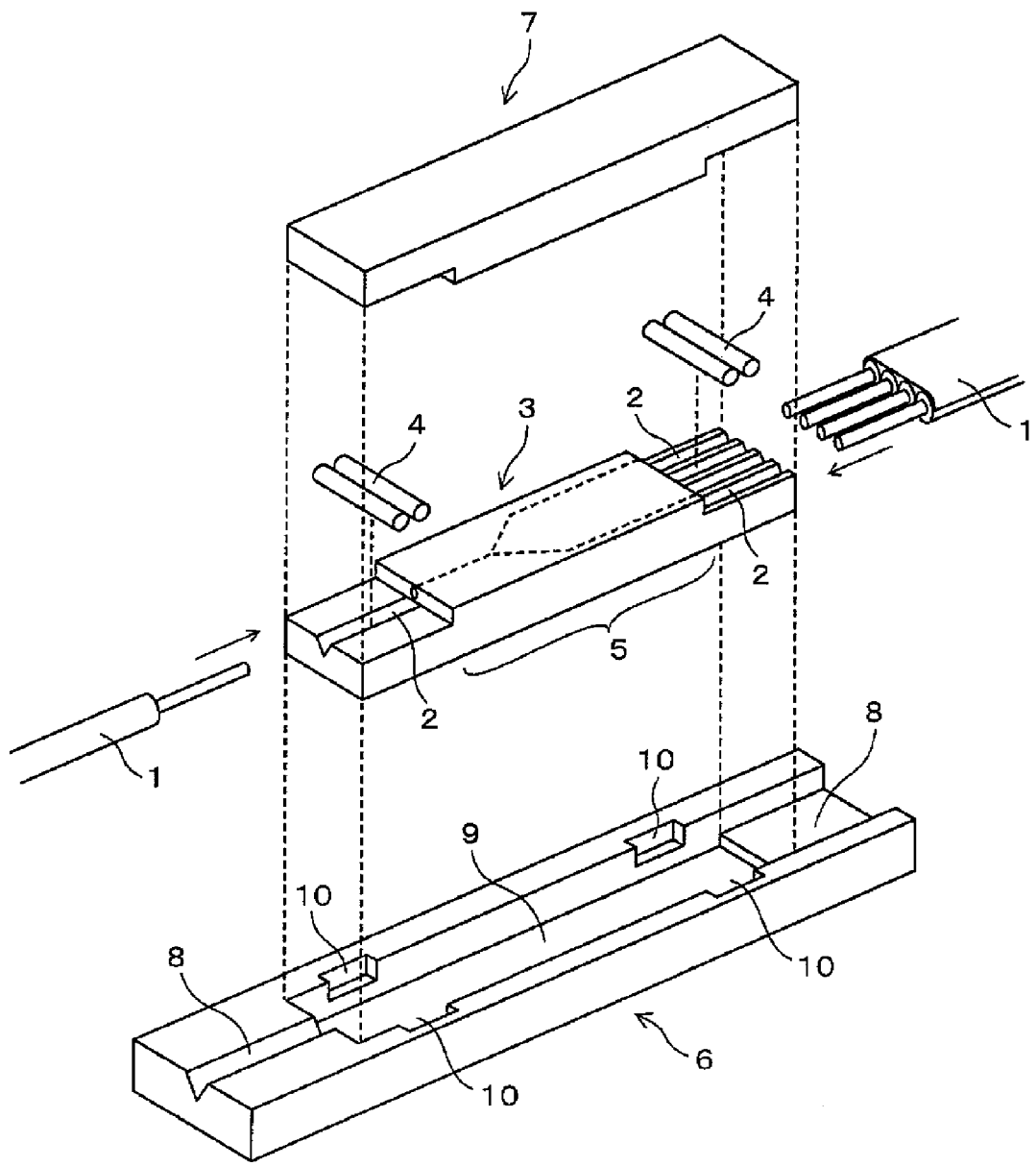
FIG. 2 is an exploded perspective view showing one embodiment of the optical connecting structure of the present invention.

FIG. 2 is an exploded perspective view showing an embodiment of an optical connecting structure of the present invention. The optical connecting structure of the present invention comprises optical fibers 1, an optical member 3 having optical fiber holding grooves 2 at both ends, and pressing members 4 in which a cross section thereof is circular, as shown in FIG. 2. The optical member 3 comprises an optical waveguide 5 between the optical fiber holding grooves 2 formed at both ends, and comprises optical fiber stopper structures at both ends which contact with the optical fiber holding grooves 2. The pressing members 4 are arranged on the optical fiber holding grooves 2 to cross at right angles to the optical fiber holding grooves 2. As a result, when the optical fibers 1 are inserted into the optical waveguide 5 along the optical fiber holding grooves 2, the upper surface of the optical fibers 1 is pressed in a bottom direction of the optical fiber holding grooves 2 by the pressing members 4, and the optical fibers 1 which contact with the optical waveguide 5 and are positioned can be connected with high accuracy to the optical waveguide 5 without shifting, even if adhesive, etc., is applied in this condition.

In addition, a preferable aspect of the present invention further comprises a package member 6 and a pressing member supporting member 7. The package member 6 comprises optical fiber containing grooves 8, an optical member containing groove 9 and pressing member containing grooves 10. The optical fiber containing grooves 8 and the optical member containing groove 9 are arranged in series, and when the optical member 3 is contained in the optical member containing groove 9, the optical fiber containing grooves 8 and the optical fiber holding grooves 2 are connected in a straight line and the optical fibers 1 are contained therein.

Furthermore, when the optical member 3 is contained in the optical member containing groove 9, the pressing member containing grooves 10 is arranged on the optical fiber holding grooves 2 to cross at right angles to the optical fiber holding grooves 2, and the upper surface of areas having optical fiber holding grooves 2 of the optical member 3 is arranged to be a bottom surface of the pressing member containing grooves 10. According to such a structure, when the pressing members 4 are contained in the pressing member containing grooves 10, the pressing members 4 are rotatable in a circumference direction of a cylinder or a column and are arranged to cross at right angles to the optical holding grooves 2, and the optical fibers 1 and the optical waveguide 5 are connected with greater accuracy.

In addition, the pressing member supporting member 7 is arranged so as to support the pressing members 4 on the optical member 3 which comprises the pressing members 4, and according to this structure, the optical connecting structure is sandwiched by the pressing member supporting member 7 and the package member 6.

Figure 3:
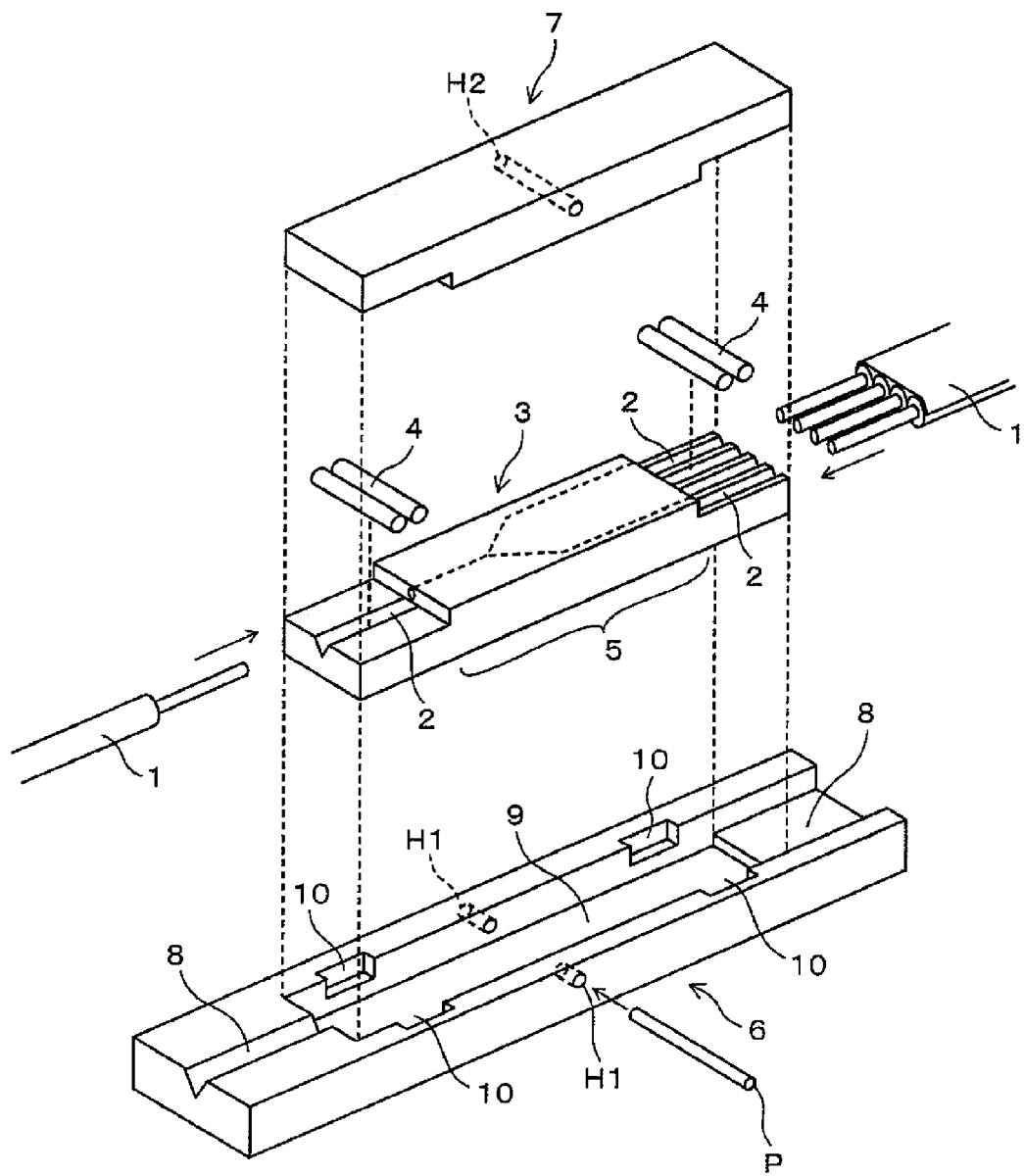
FIG. 3 is an exploded perspective view showing another embodiment of the optical connecting structure of the present invention.

Furthermore, FIG. 3 is an exploded perspective view showing another embodiment of an optical connecting structure of the present invention. Symbols H1 and H2 indicate through holes and a symbol P indicates a supporting bar. In this embodiment, the package member 6 and the pressing member supporting member 7 comprise through holes H1 and H2, respectively, and when the package member 6, the optical waveguide 5, the pressing members 4 and the pressing member supporting member 7 are assembled in advance, the holes H1 and H2 are arranged so that central axes thereof are coaxial. The optical connecting structure is held in a body by inserting the supporting bar P into the holes H1 and H2 as arranged above. Additionally, the structure can be prevented from breaking the optical fiber due to excessive pressure of the pressing members 4 by the pressing member supporting member 7.

In the following, each element of the optical connecting structure of the present invention will be explained in more detail.

It is necessary that a cross section of the pressing member in the present invention be circular. In the present invention, the circular cross section means that rotation about a center axis of the pressing member can be carried out. Additionally, it is preferable that the pressing members in the present invention have a degree of freedom of rotation when the optical fibers are inserted, and be contained in the pressing member containing grooves so as to be movable in a vertical direction (up and down and right and left: y direction and z direction) to the central axis within a given range. According to the above aspect, the optical fiber containing groove formed on the optical member, the optical fiber containing groove formed on the package member, and the pressing members are arranged as shown in FIG. 4, and consequently, an edge of the optical fiber is suitably inserted between the optical fiber holding groove and the pressing members.

In addition, it is preferable that the pressing members in the present invention be arranged so that axial directions of the pressing members cross at right angles to an axial direction of the optical fiber, that is, that the pressing members be arranged so that axial directions of the pressing members cross at right angles to a length direction of the optical fiber holding grooves. Since a cross section of the optical fiber is circular, pressure is transmitted from the pressing members to the optical fiber via a point contact by pressing at right angles. Thus by pressing the optical fiber to cross at right angles to the pressing members having a circular cross section, pressure in an axial direction of the optical fiber and the pressing members can be remarkably decreased and the optical fiber holding grooves faced to the pressing members can be pressed at right angles. Therefore, the optical fiber can be pressed only in a y direction, and unnecessary force that shifts the optical fiber in a z direction or an x direction does not easily act.

Figure 4A:
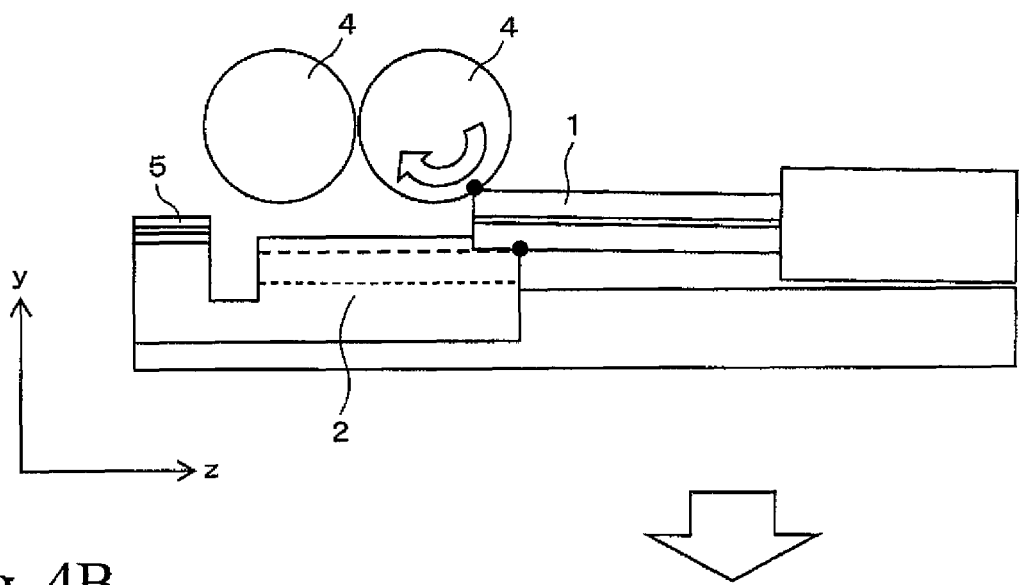
FIG. 4 is an enlarged diagram showing around the optical fiber holding groove and the pressing member in the optical connecting structure of the present invention.
Figure 4B:
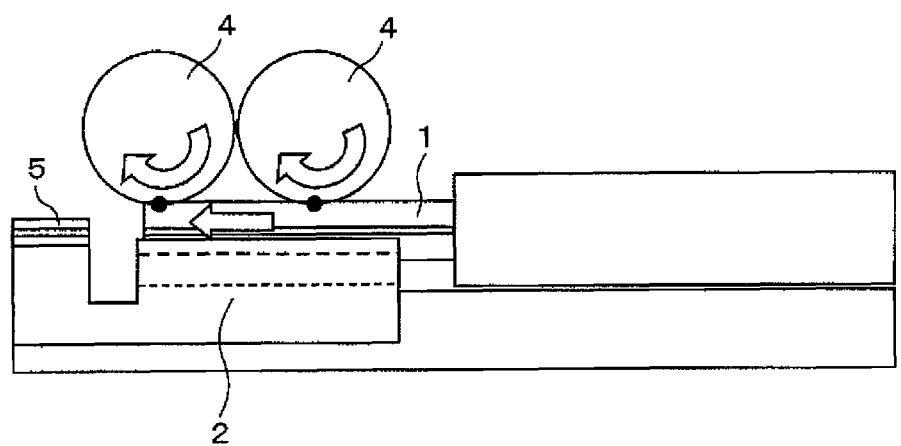
Figure 5:
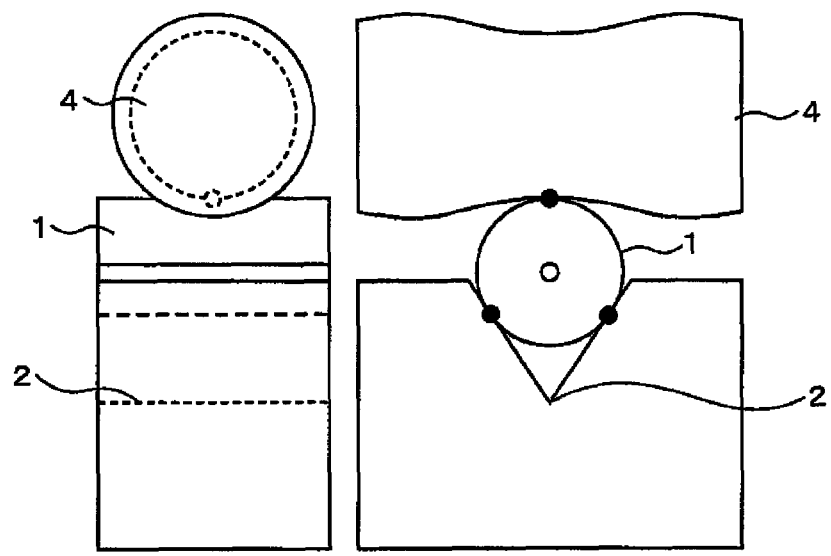
FIG. 5 is a conceptual diagram showing a changed example of the pressing member in the optical connecting structure of the present invention.
Figure 6:
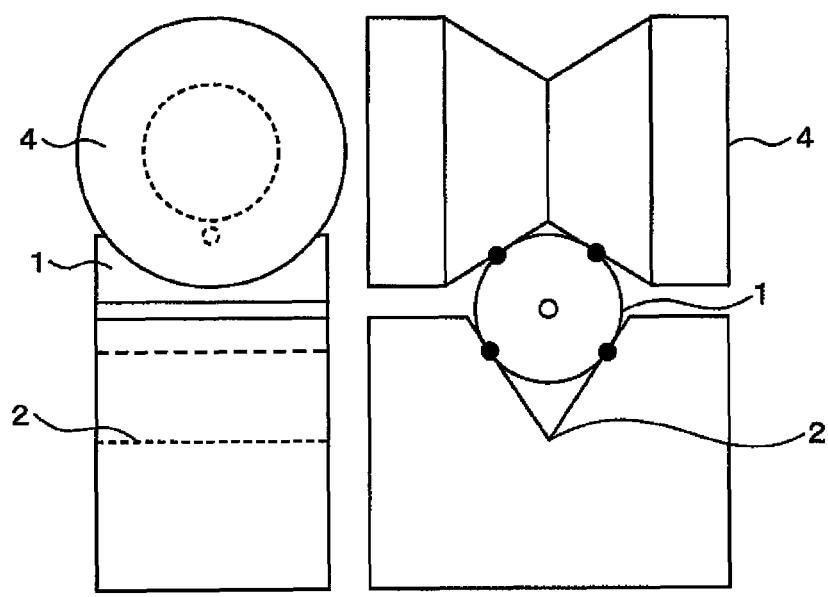
FIG. 6 is a conceptual diagram showing a changed example of the pressing member in the optical connecting structure of the present invention.
Figure 7:
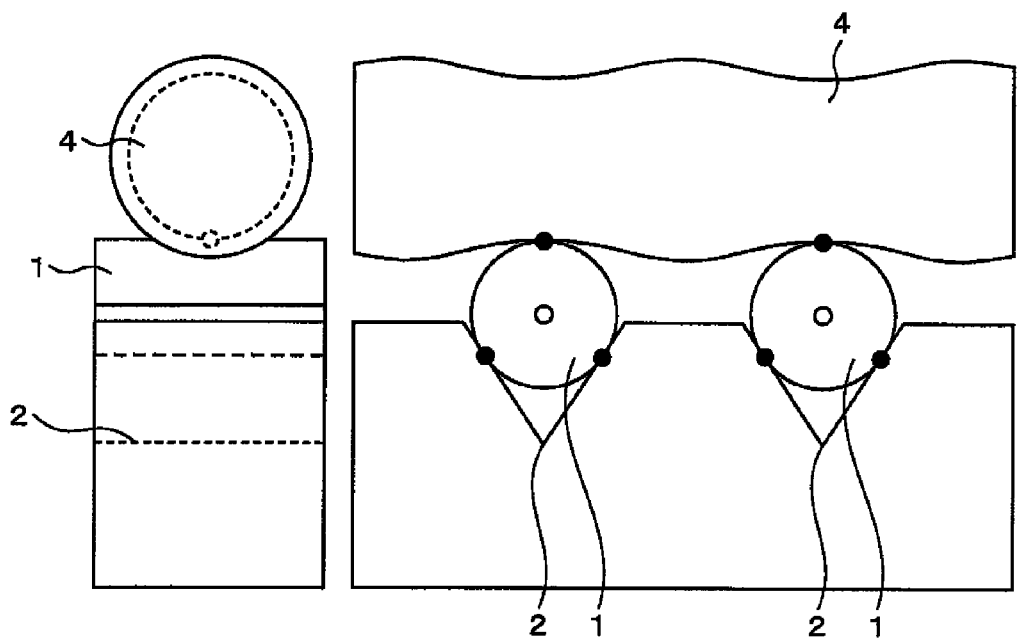
FIG. 7 is a conceptual diagram showing a changed example of the pressing member in the optical connecting structure of the present invention.
Figure 8:
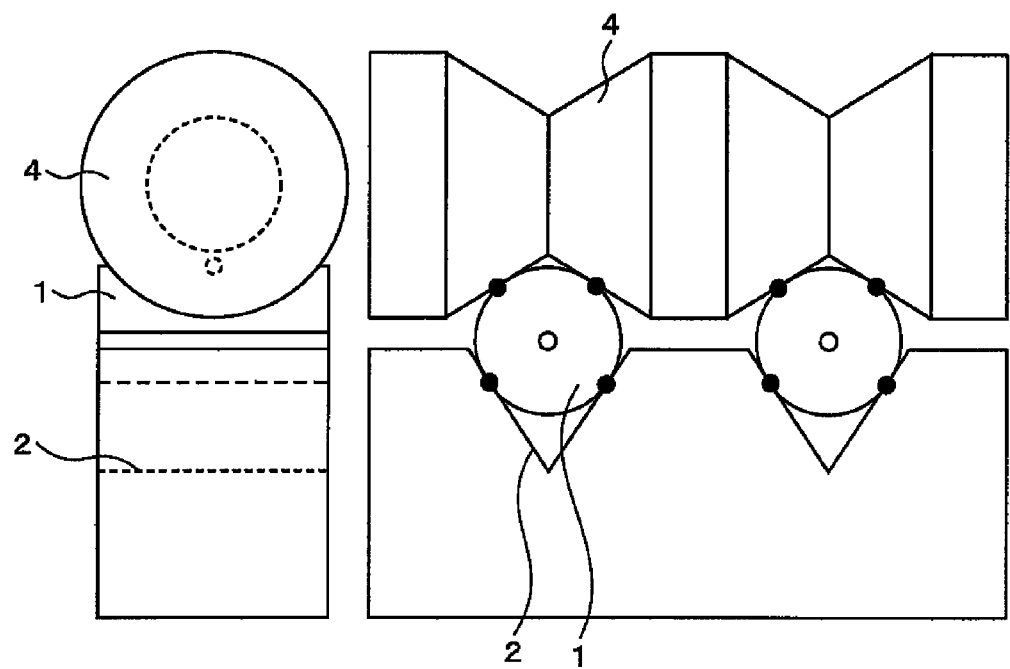
FIG. 8 is a conceptual diagram showing a changed example of the pressing member in the optical connecting structure of the present invention.

The operation of the pressing members will be explained in more detail with reference to the figures. FIG. 4 is an enlarged view of the optical fiber holding grooves and the pressing members in the optical connecting structure of the present invention. The pressing members 4 in the present invention having a circular cross section are arranged on the optical fiber holding grooves 2 to cross at right angles to the optical fiber holding grooves 2, as shown in FIG. 4A. When the optical fiber is inserted in the optical member 5 along the optical fiber holding grooves 2, as shown in FIG. 4B, the optical fiber 1 contacts with bottoms of the pressing members 4, lifts upwardly the pressing members 4, and passes under the bottoms of the pressing members 4. When the optical fiber 1 is further inserted, the pressing members 4 function as a roller, and the optical fiber 1 is contacted with the optical member 5 and is positioned. In this condition, side surfaces of optical fiber 1 are pressed to the optical fiber holding grooves 2 in a bottom direction by the pressing members 4, arrangement of the optical fiber 1 and the optical member 5 is fixed, and the optical fiber 1 and the optical member 5 are connected with high accuracy without shifting an edge of the optical fiber 1.

In addition, it is preferable that the pressing members in the present invention having a circular cross section so as to be arranged so that some pressing members stand in a line and cross at right angles to the optical fiber holding grooves. It is preferable that the pressing members be 2 to 5, it is more preferable that they be 2 to 3, and it is most preferable that they be 2. According to this aspect, the optical fiber can be fixed more reliably by pressing, and when the optical fiber is inserted or removed, the optical fiber can be smoothly mounted by moving in an optical axis thereof. The number of the pressing members can be suitably selected according to the length of the optical fiber holding groove and the diameter of the pressing member. When the number is too great, the optical fiber holding groove is lengthened in proportion to the number, package size is unnecessary lengthened, and as a result, costs for producing the optical waveguide are increased. Additionally some point supports of the optical fiber and the pressing members in an optical axis are added to a linear support of the optical fiber and the optical fiber holding groove by arranging some pressing members, and therefore, an edge of the optical fiber can be prevented from shifting in a horizontal direction (moving of an edge of the optical fiber tip due to bending), and a highly accurate optical connecting structure can be easily formed.

Furthermore, in the present invention, it is preferable that on an optical member in which optical fiber holding grooves are formed on both sides of an optical element, the pressing members be arranged on both sides of the optical element, respectively, and pressure be transmitted by a pressing member supporting member via the pressing members arranged on the both sides. According to this structure, when the pressing member supporting member is pressed by a clipping member, each of the pressing members arranged on both sides of the optical elements can be evenly pressed.

In addition, in the present invention, it is preferable that a diameter of the pressing member having a circular cross section be 0.1 to 10 mm, and it is more preferable that it be 0.3 to 3 mm. When the diameter of the pressing member is below 0.1 mm, the strength of the pressing member is insufficient, and in contrast, when the diameter exceeds 10 mm, not only is it bulky, but also a function as a roller is prevented. Furthermore, the optical fiber holding groove is lengthened, and as a result, costs for producing the optical waveguide are increased. The diameter of the pressing member is selected in consideration of elastic modulus, distortion or strength of material used for the pressing member, and width of the optical waveguide, that is, length of the pressing member. In addition, the diameter of the pressing member should be selected in consideration of diameter and relative dimension of the optical fiber. Furthermore, it is preferable that the diameter of the pressing member be 1/10 to 10 times and is more preferable that it be 1/5 to 6 times, in comparison with the diameter of the optical fiber. Additionally when the pressing member is made of stainless steel and is in a cylindrical shape and a diameter of cladding of the optical fiber is 125 μm, it is preferable that the diameter of the pressing member be in a range from 0.4 to 1 mm, and it is more preferable that it be in a range from 0.5 to 0.7 mm.

Furthermore, it is necessary that the pressing member in the present invention having a circular cross section be rotatable about a center axis thereof, in order to function as a roller. Therefore, it is preferable that the pressing member be in a cylindrical shape or in a columnar shape, since a highly accurate part is available at low cost. In addition, the pressing member having a circular cross section may be a pressing member that is a rotator in an hourglass shape, as shown in FIGS. 5 to 8. According to such a structure, when the optical fiber is inserted, the optical fiber can be prevented from shaking in an x direction, thereby supporting the accurate insertion of the optical fiber in an axial direction of the optical fiber holding groove.

In addition, in the present invention, it is preferable that the optical fiber be movable in an axial direction thereof on the optical fiber holding groove. As illustrated by an arrow in FIG. 4, when the optical fiber is inserted, the pressing members press the optical fiber in a bottom direction of the optical fiber holding groove and rotate, and therefore, the optical fiber can be smoothly inserted to the optical fiber holding groove, since a cross section of the pressing member is circular. That is, the pressing member functions as a roller too, since a cross section thereof is circular.

The optical member in the present invention comprises an optical element, optical fiber stopper structures, and optical fiber holding grooves. In the present invention, it is preferable that the optical member comprise the optical fiber stopper structures so as to form clearance in a light input and output portion between the optical fiber and the optical member. Since an optical element itself does not double with an optical fiber stopper structure, according to the forming of the clearance, damage due to contacting an end surface of the optical fiber to the optical element can be prevented. Additionally, a focal distance of a lens is easily shortened by forming the clearance using air, and a space connecting type of an optical element is easily formed by input and output of an optical fiber. Furthermore, this aspect of the present invention has also an advantage of miniaturization.

In addition, it is preferable that the optical element in the present invention be at least one optical element selected from an optical waveguide, an optical lens, an optical crystal, and an optical filter. In the case in which the optical element is an optical waveguide and the optical waveguide is an optical waveguide substrate formed with optical fiber holding grooves in a body, the optical connecting structure of the present invention is most effectively used. When the optical element is an optical waveguide, it is necessary that the diameter of the optical fiber, and the depth and width of the optical fiber holding groove, etc., be suitably adjusted so as to arrange a core of the optical waveguide and a core of the optical fiber on the same line.

Furthermore, it is preferable that refractive index matching material in a liquid state, in a gel state, or in an amorphous solid state be contained in the clearance of the optical fiber and the optical element. It is most preferable that this aspect be used in an optical element that is optically connected with the optical fiber without using a lens, etc. According to this aspect, the effect of Fresnel reflection based on differences of refractive indexes of air and the optical fiber or air and the optical element can be decreased, thereby reducing loss, increasing return loss, and reducing stray light.

Figure 9:
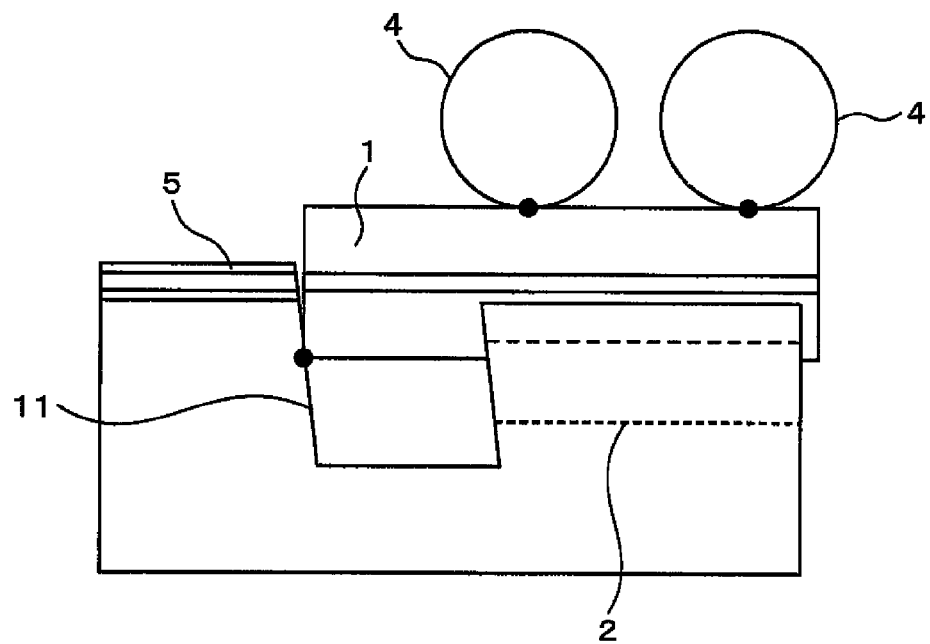
FIG. 9 is a conceptual diagram showing an example of the optical fiber stopper structure in the optical connecting structure of the present invention.

In addition, in the optical connecting structure of the present invention, it is preferable that a refractive index matching material (generally called a matching oil) be used in the clearance between an edge of the optical fiber and an edge of the optical element, in order to further reduce connecting loss of the optical fiber and the optical element. The refractive index matching material may be in a liquid state, in a gel state, or in a film state, and may use transparent amorphous resin also. The refractive index of the refractive index matching material is determined in consideration of an equivalent refractive index of the optical fiber and the optical element depending on the purpose. Specifically, it is preferable that the refractive index matching material have an average refractive index of both equivalent refractive indexes of the optical fiber and the optical element. Additionally, when the optical element has a structure in which an end thereof is obliquely cut as shown in FIG. 9, it is preferable that a refractive index matching material having the same refractive index as the equivalent refractive index of the optical fiber be used.

The stopper structure in the present invention may be an end surface of the optical element having a function thereof, and may be a structure in which the optical fiber contacts with another position other than the end surface of the optical element. When the optical element is an optical lens, it is necessary to arrange the lens so that optical axes thereof and the optical fiber are coaxial, and to suitably adjust each cross section, position of the optical fiber stopper structure, etc., in consideration of a focal distance of the lens and numerical aperture (NA) thereof.

Figure 1:
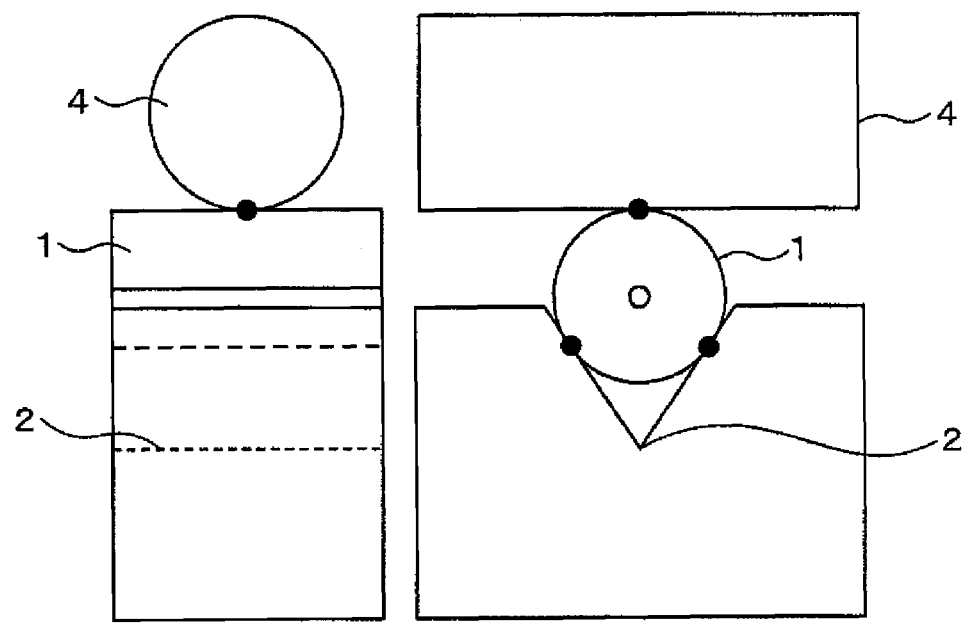
FIG. 1 is a diagram showing a structural example around a connecting part of an optical fiber in the optical connecting structure of the present invention.
Figure 10:
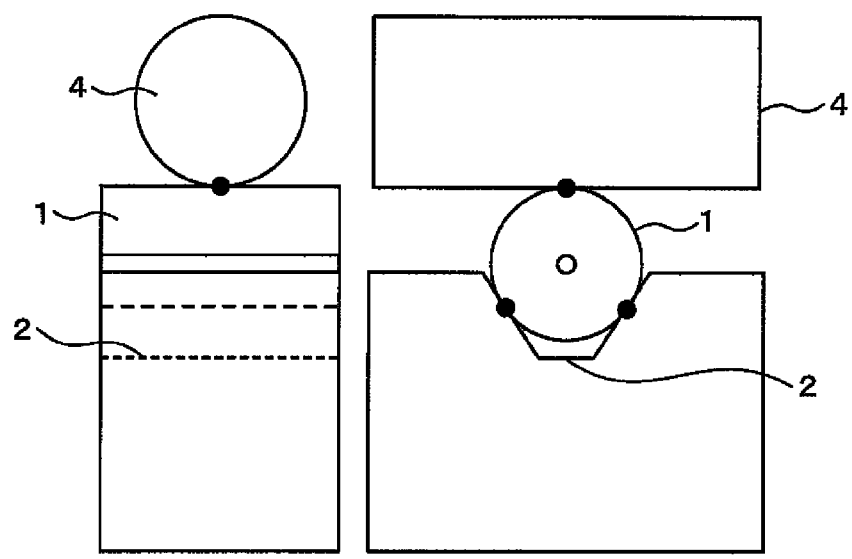
FIG. 10 is a conceptual diagram showing a changed example of the optical fiber holding groove in the optical connecting structure of the present invention.
Figure 11:
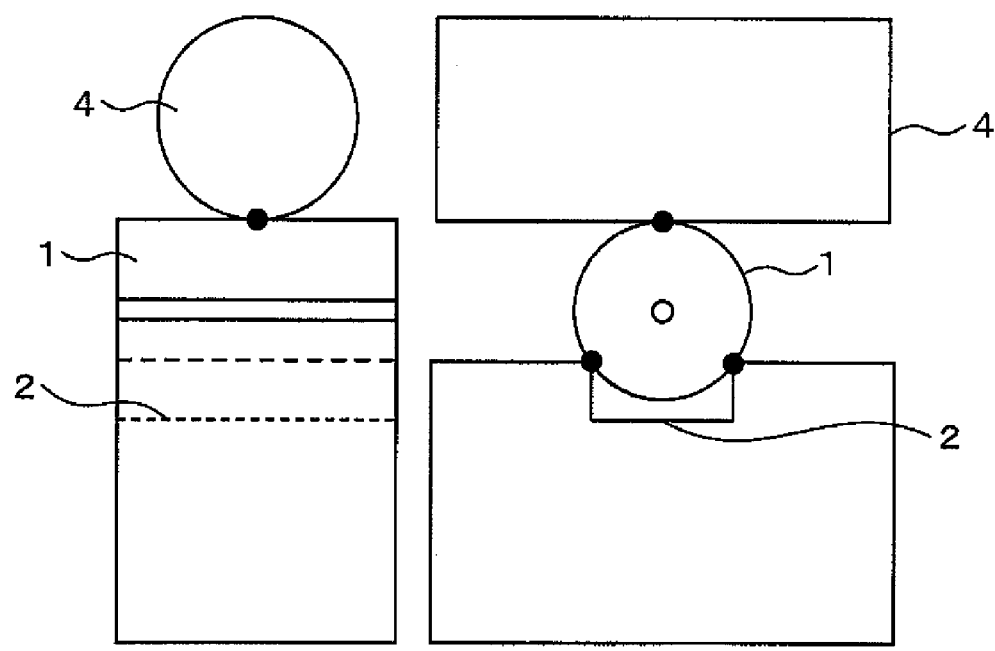
FIG. 11 is a conceptual diagram showing a changed example of the optical fiber holding groove in the optical connecting structure of the present invention.

In addition, in the present invention, it is preferable that a cross section of the optical fiber holding groove be any of a V-shape, an inverted trapezoidal shape, and a concave shape, the optical fiber and the optical fiber holding groove contact via two straight lines, and the pressing member and the optical fiber contact via one point. FIG. 1 shows an embodiment using a V-shaped optical fiber holding groove, FIG. 10 shows an embodiment using an inverted trapezoidal shaped optical fiber holding groove, and FIG. 11 shows an embodiment using a concave shaped optical fiber holding groove. In the figures, contacting points and contacting lines are shown by black circles and by thick broken lines. Three point support is formed by a contacting point of the optical fiber and the pressing member arranged at right angles to the optical fiber and two contacting lines of the optical fiber and the optical fiber holding groove on facing surfaces of the optical fiber holding groove which sandwich the optical fiber, and therefore, highly accurate positioning can be carried out. Of these, it is preferable that the optical fiber holding groove be an optical fiber holding groove having a V-shaped cross section, and in particular, it is more preferable that the optical fiber holding groove be a silicon V-shaped groove using an anisotropic etching of silicon, since a highly accurate V-shaped groove can be simply produced by positioning at an optical waveguide, etc., with high accuracy.

Figure 12:
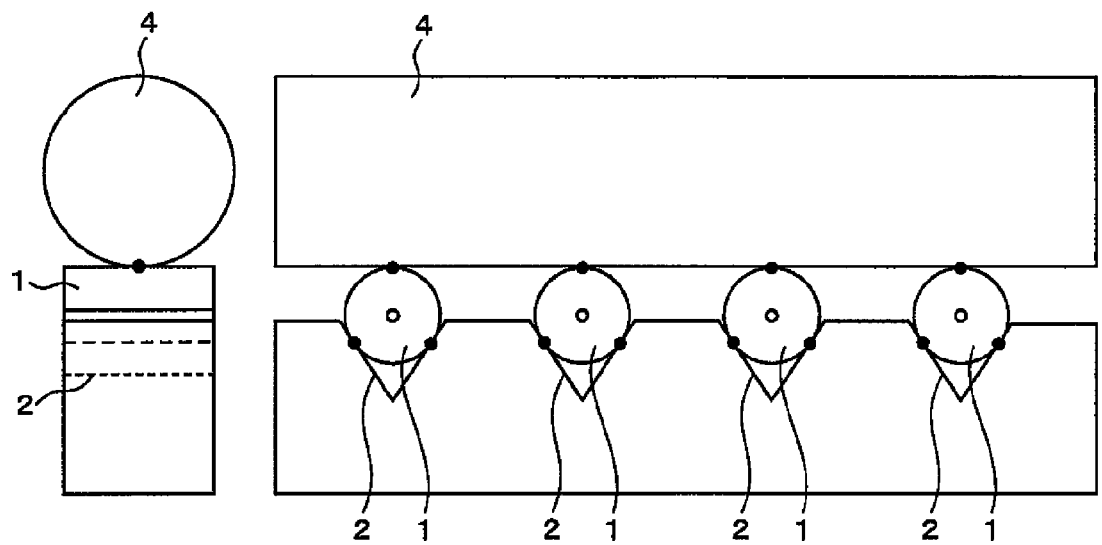
FIG. 12 is a conceptual diagram showing an example in which plural optical fibers are used in the optical connecting structure of the present invention.
Figure 13:
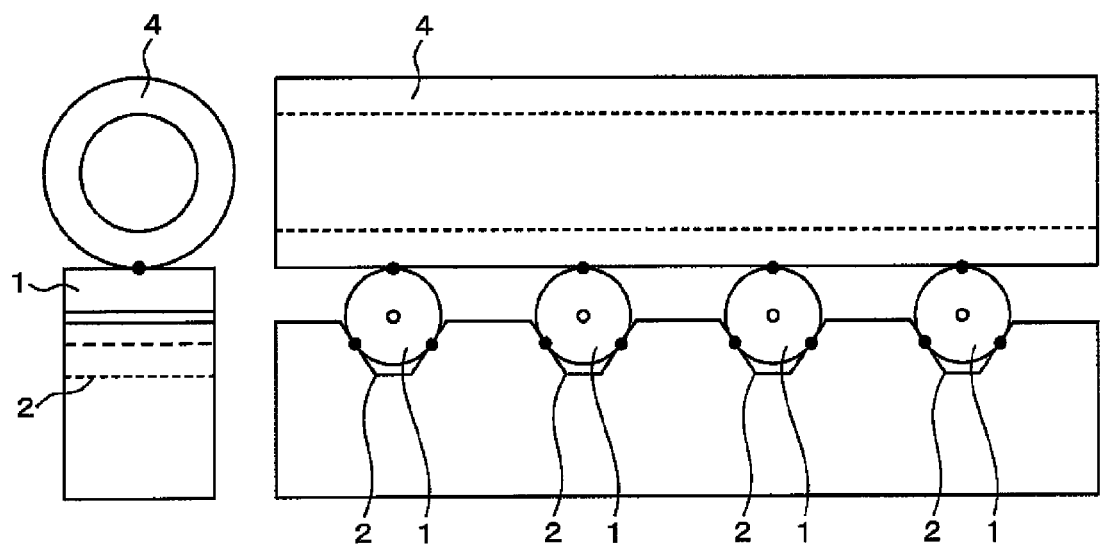
FIG. 13 is a conceptual diagram showing an example in which plural optical fibers are used in the optical connecting structure of the present invention.

The optical fiber in the present invention is formed by covering around a core and a cladding with resin, and the resin is removed on an edge which contacts with the optical member. In addition, the optical fiber in the present invention is not limited to optical fibers having a single core, and a tape-type optical fiber core which binds some optical fibers in a tape shape, etc, may be suitably used, and quantity of the optical fiber to be connected at one time is not limited. The optical connecting structures using a tape-type optical fiber core are shown in FIGS. 12 and 13. FIG. 12 shows an embodiment which applies a tape-type optical fiber core comprising four optical fibers to a V-shaped optical fiber holding groove, and FIG. 13 shows an embodiment which applies a tape-type optical fiber core comprising four optical fibers to an inverted trapezoidal shaped optical fiber holding groove. The optical connecting structure of the present invention can connect the optical fiber and the optical member with a high accuracy, and therefore, as an optical fiber in the present invention, an optical fiber made of quartz comprising a very thin core is preferably used. Furthermore, the refractive index distribution in the optical fiber can be suitably selected from stepped distribution, gradient distribution, etc., depending on the purposes.

In the present invention, in order to connect the optical fiber and the optical member with high accuracy, it is preferable that a package member and a pressing member supporting member be further comprised, and the above optical connecting structure be sandwiched by these members. In addition, it is preferable that the package member and the pressing member supporting member comprise through holes (H1 and H2), and be united with the structure by inserting a supporting bar P into these through holes. According to this aspect, the optical fiber and the optical member can be connected with greater accuracy.

Additionally, in the present invention, it is preferable that an inner diameter of the through hole H2 formed in the pressing member supporting member be larger than an outer diameter of the supporting bar P, and the pressing member supporting member be movable in a vertical direction (up and down and right and left) to an axial direction of the supporting bar. According to this aspect, although the package member is fixed by the supporting bar, the pressing member supporting member is loosely fixed by the package member. As a result, the pressing member supporting member is movable, the pressure member has a given degree of freedom of position and a given degree of freedom of rotation, and the above effect of a roller can be suitably exhibited, and moreover, a self-guiding function of the pressing member can be exhibited by suitable vertical movement of the pressing member depending on the vertical position of the optical fiber when the optical fiber is inserted, and furthermore, the pressing member supporting member can be prevented from excessively pressing downward on the pressing member, and from applying excessive pressure to the optical fiber.

Furthermore, in the present invention, it is preferable that the package member and the pressing member supporting member be sandwiched and fixed in a laminated state by a clipping member. According to this aspect, the optical fiber and the optical member can be connected more reliably. In addition, the optical fiber can be smoothly inserted and removed by the clipping member being removable, or by controlling to press the pressing member supporting member using a wedge-shaped jig, etc. For example, the optical fiber is inserted and moved in an optical axis direction in a condition in which pressure to the pressing member supporting member is released or reduced by removing the clipping member, thereby contacting an edge of the optical member. Then, the pressing member supporting member is pressed by the clipping member, and the optical fiber is pressed in a bottom direction of the optical fiber holding groove via the pressing member. As a result, the optical fiber can be held and fixed so as to be not easily removed. Subsequently, the optical fiber can be easily moved in an optical axis direction and be removed by removing the clipping member again, as necessary.

Figure 14:
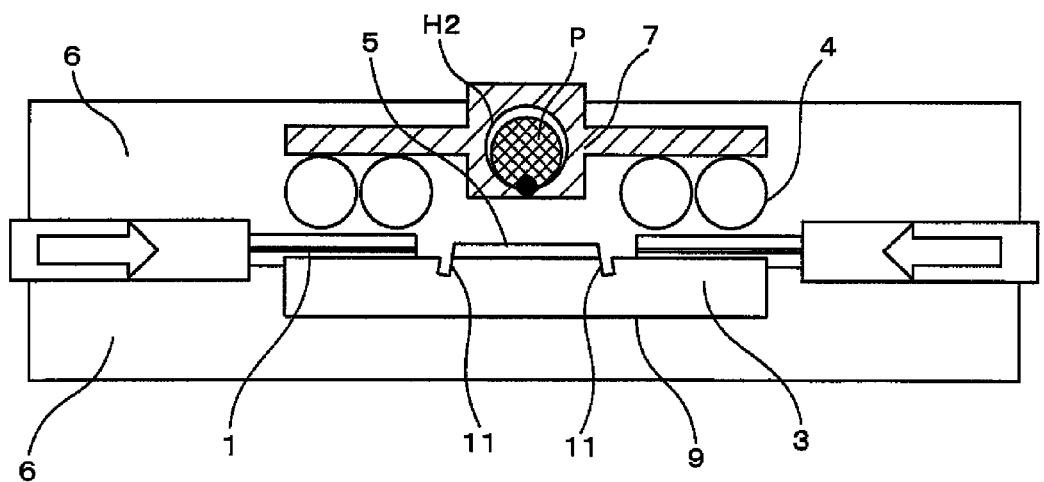
FIG. 14 is a conceptual diagram showing an example of the pressing member supporting member in which the clip shaped member is not applied in the optical connecting structure of the present invention.
Figure 15:
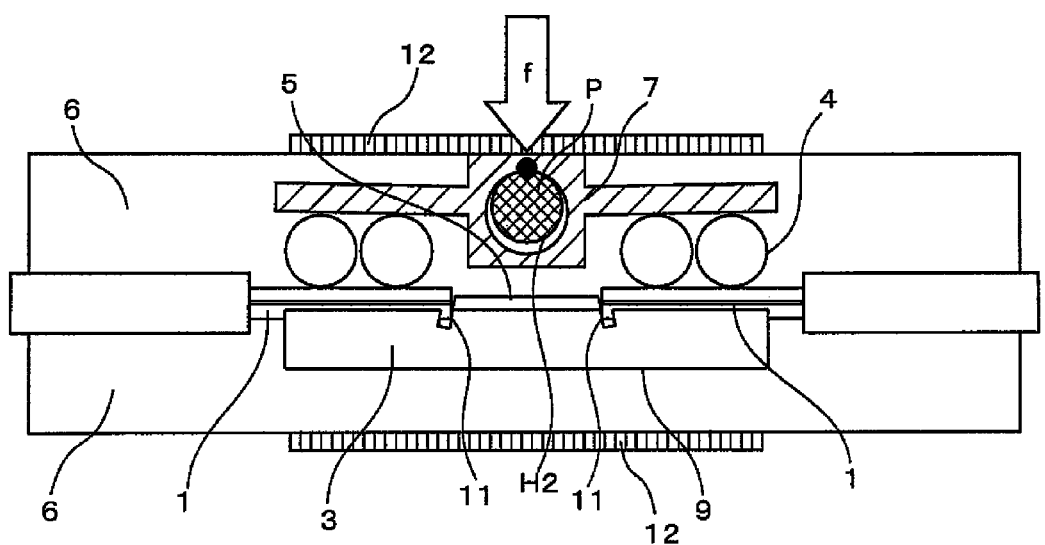
FIG. 15 is a conceptual diagram showing an example of the pressing member supporting member in which the clip shaped member is applied in the optical connecting structure of the present invention.

The pressing member supporting member 7 in the present invention is arranged so as to be in a state in which it maximally moves upward, as shown in FIG. 14, when the optical fiber 1 is inserted and removed, and it is pressed by the clipping member 12, as shown in FIG. 15, when the optical fiber 1 is inserted to the optical fiber stopper structure 11, and it bends slightly while moving downward, transmits pressure to the pressing member 4, and presses the optical fiber 1 in a bottom direction of the optical fiber holding groove 2, thereby positioning and fixing the optical fiber 1.

In addition, the pressing member supporting member in the present invention can contact with the clipping member via a surface contact. That is, in a state in which the pressing member supporting member maximally moves upward, as shown in FIG. 14, a contacting surface portion to be pressed of the pressing member supporting member may be protruded from the package member. The pressing member supporting member is moved within a given degree of freedom with the above mentioned structure in which the pressing member supporting member is protruded from the package member, pressed by using the clipping member, thereby transmitting pressure by the clipping member.

Pressure which is applied to the optical fiber should be optimally designed based not only on the elastic force of the clipping member, but also on the protruded height as described above, elastic modulus of the pressing member supporting member, flexibility depending on shapes such as length, width, thickness, etc., deformability of the package member, or the like. In particular, the shape of the pressing member supporting member can be selected according to the design of the strength of materials, such as materials and length used in the pressing member supporting member, etc. For example, when the flexibility of the pressing member supporting member is large, the pressing member supporting member is transformed by the clipping member until height of an upper surface of the pressing member supporting member is the same as that of an upper surface of the package member, in consideration of the case in which the protruded height is small. Consequently, the deformability of the pressing member supporting member can be maintained to a specific value, even if spring force of the clipping member is varied. Therefore, it is not necessary that the clipping member have a highly accurate spring force, the clipping member can be produced at low cost, and pressure does not change, even if a balancing position shape of the spring changes. In addition, if the protruded height of the pressing member supporting member is suitable, the optical fiber can be prevented from being damaged due to transmission of excessive pressure to the optical fiber, and optical characteristics of the optical fiber can be prevented from deteriorating due to stress.

Figure 16:
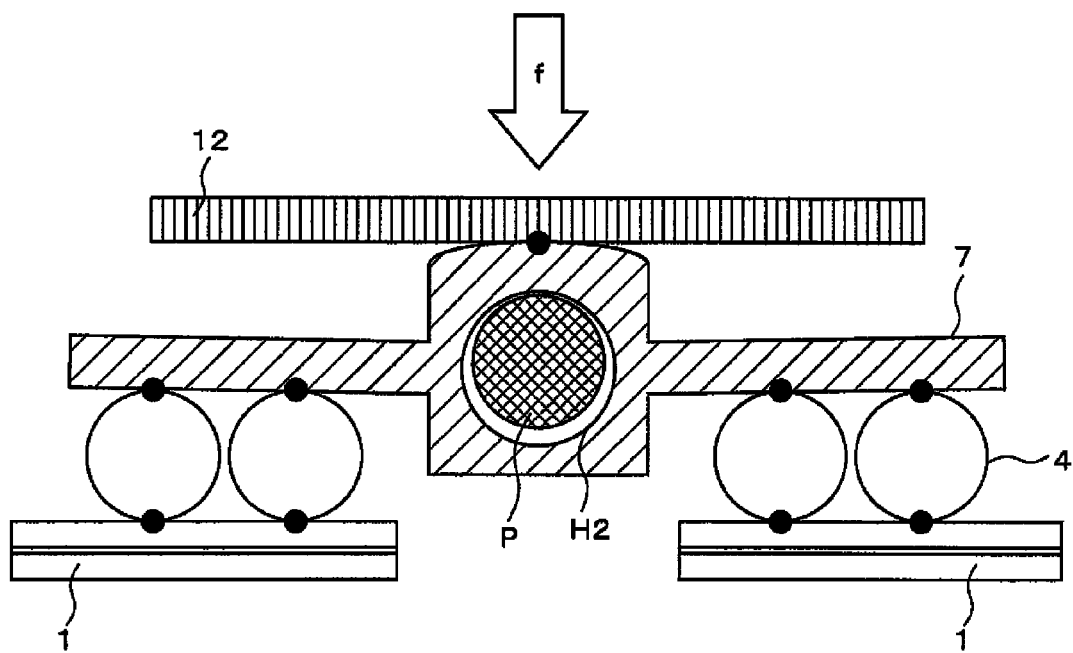
FIG. 16 is a conceptual diagram showing a modified example of the pressing member supporting member in the optical connecting structure of the present invention.
Figure 17:
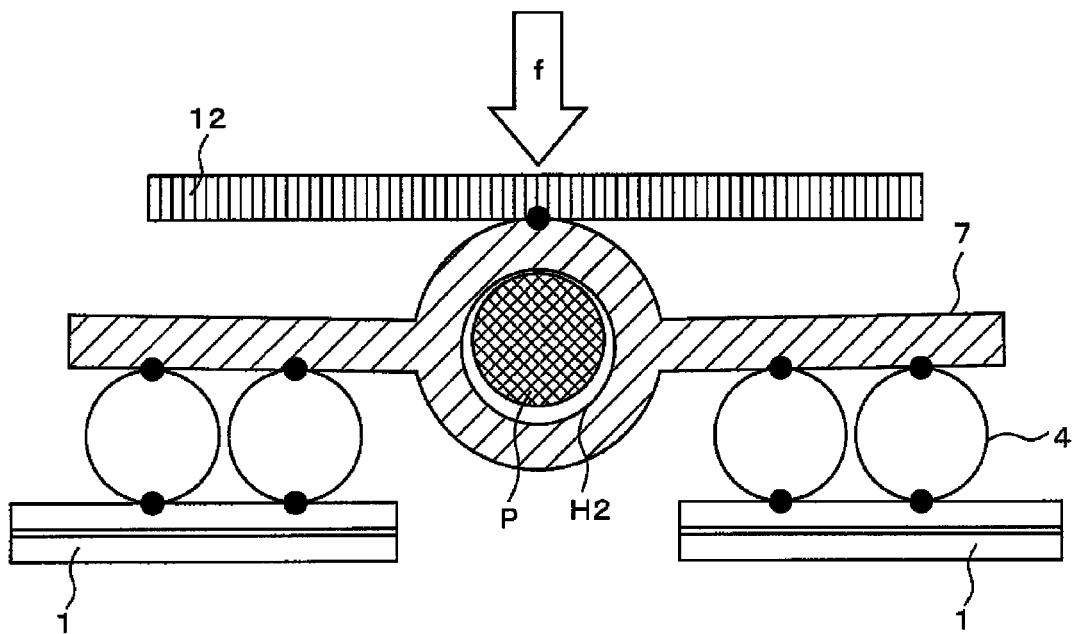
FIG. 17 is a conceptual diagram showing a modified example of the pressing member supporting member in the optical connecting structure of the present invention.
Figure 18:
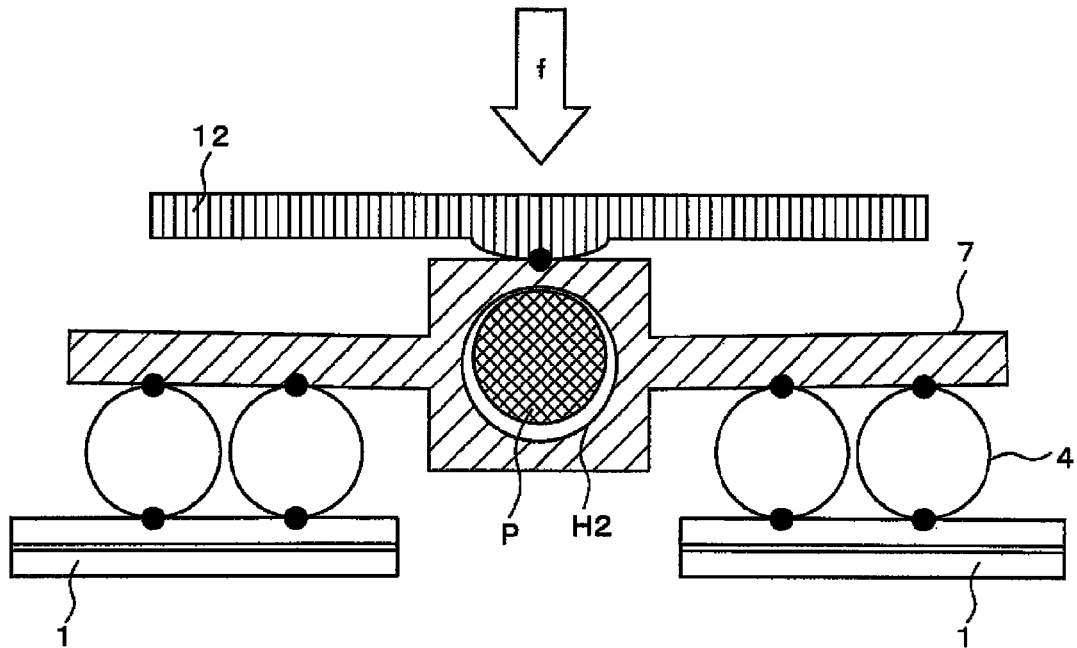
FIG. 18 is a conceptual diagram showing a modified example of the clip shaped member in the optical connecting structure of the present invention.
Figure 19:
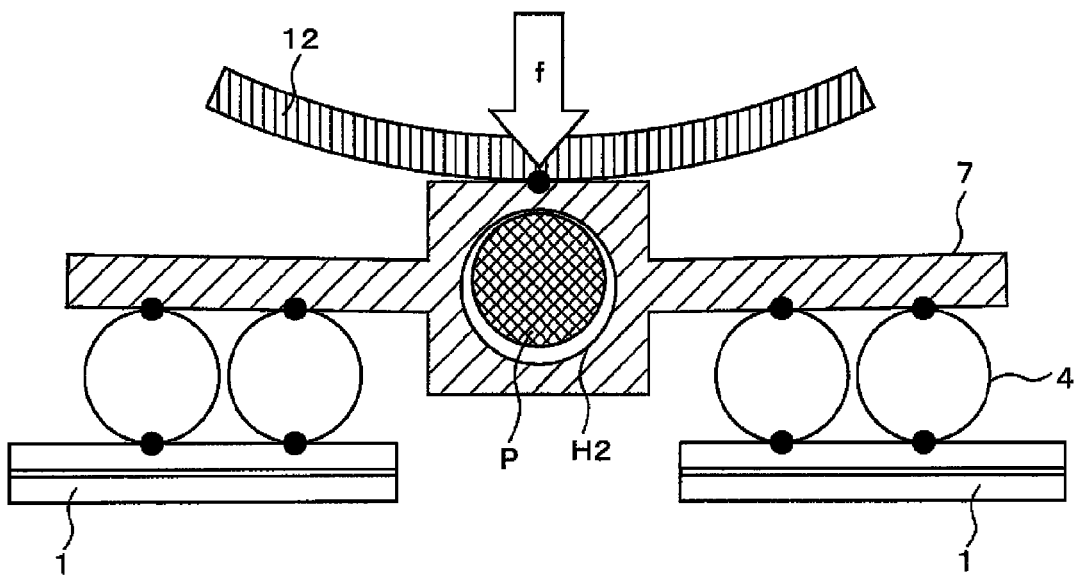
FIG. 19 is a conceptual diagram showing a modified example of the clip shaped member in the optical connecting structure of the present invention.

Contacting area of the pressing member supporting member and the clipping member can be controlled by a structure of the upper surface of the pressing member supporting member. That is, the upper surface may be of a shape shown in FIGS. 2 and 3 or a shape shown in FIGS. 14 and 15. Additionally, the pressing member supporting member in the present invention can transmit pressure from the clipping member to the pressure member supporting member via line contacts or point contacts, by curving the upper surface or by forming a convex portion on the upper surface, as shown in FIGS. 16 and 17. Similarly, a similar pressure transmission structure can be formed by curving the lower surface of the clipping member or by forming a convex portion on the lower surface, as shown in FIGS. 18 and 19.

As described above, the structure which transmits pressure from the clipping member to the pressing member supporting member via line contacts or point contacts, can be formed by curving the pressing member supporting member or the clipping member, etc. As a result, the pressing member supporting member has a function in which pressure on the pressing member is automatically equalized by a movement like that of a seesaw in which the above contact site functions as a supporting point. In particular, the function of equalization and dispersion of pressure is effective when number of the optical fiber installed at each end differs.

Figure 20:
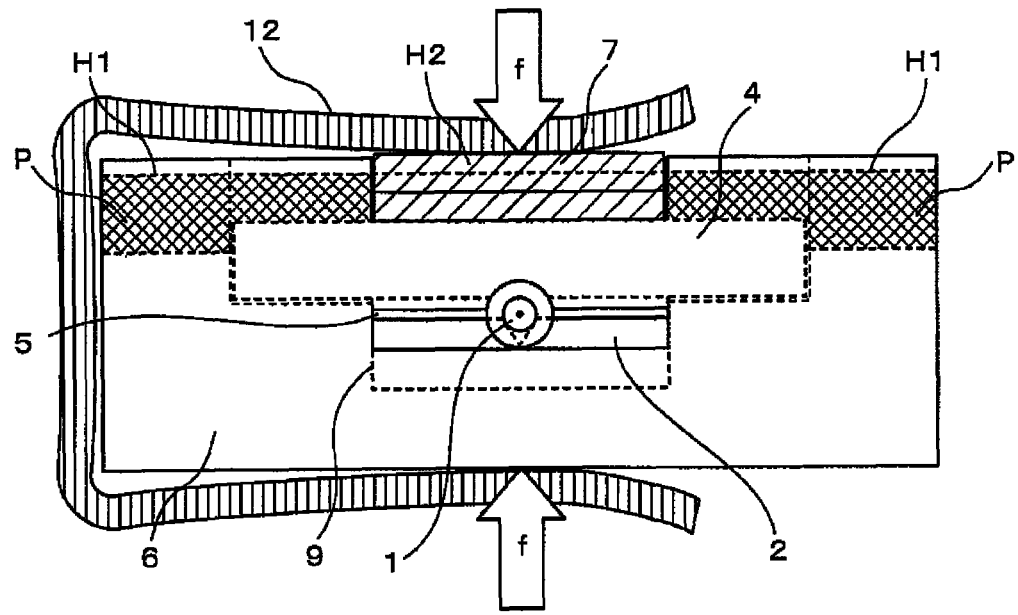
FIG. 20 is a conceptual diagram showing an example of the construction in which an optical fiber is pressed by the clip shaped member in the optical connecting structure of the present invention.
Figure 21:
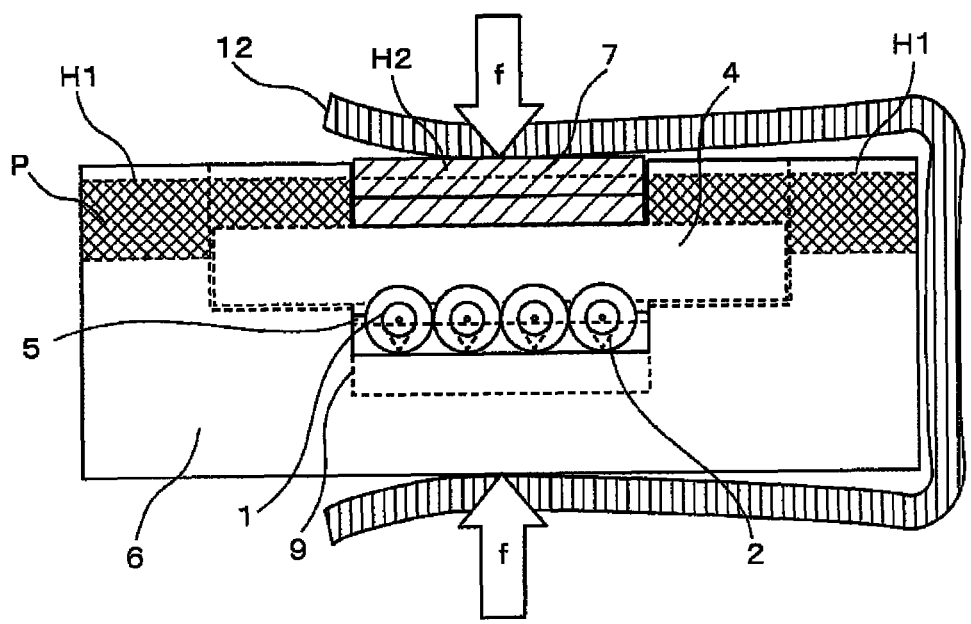
FIG. 21 is a conceptual diagram showing an example of the construction in which plural optical fibers are pressed by the clip shaped member in the optical connecting structure of the present invention.

The pressure on each optical fiber can be optimized appropriately according to asymmetry length, thickness, and width of right and left beam portions of the pressing member supporting member, even if the number of the optical fibers installed at each end differs, as shown in FIGS. 20 and 21. In this case, it is necessary to produce pressing member supporting members having different shapes corresponding to the number of the optical fibers installed at each end. However, if the above seesaw function is applied, a common pressing member supporting member can be used with respect to an optical waveguide, etc., having a different number ratio of optical fibers installed at each end, thereby decreasing the types of pressing member supporting members. Both of the seesaw function and the asymmetric structure can be applied to the pressing member supporting member.

Suitable pressure can be carried out by three point support which are one contact point of the pressing member supporting member and the clipping member and two contact points of the pressing member supporting member and the pressing member, when one pressing member is arranged at each end, that is, two pressing members are arranged at the two ends. Alternatively, pressure is transmitted to the pressing member supporting member by five point support, when two pressing members are arranged at each end, that is, four pressing members are arranged at the two ends.

Figure 22:
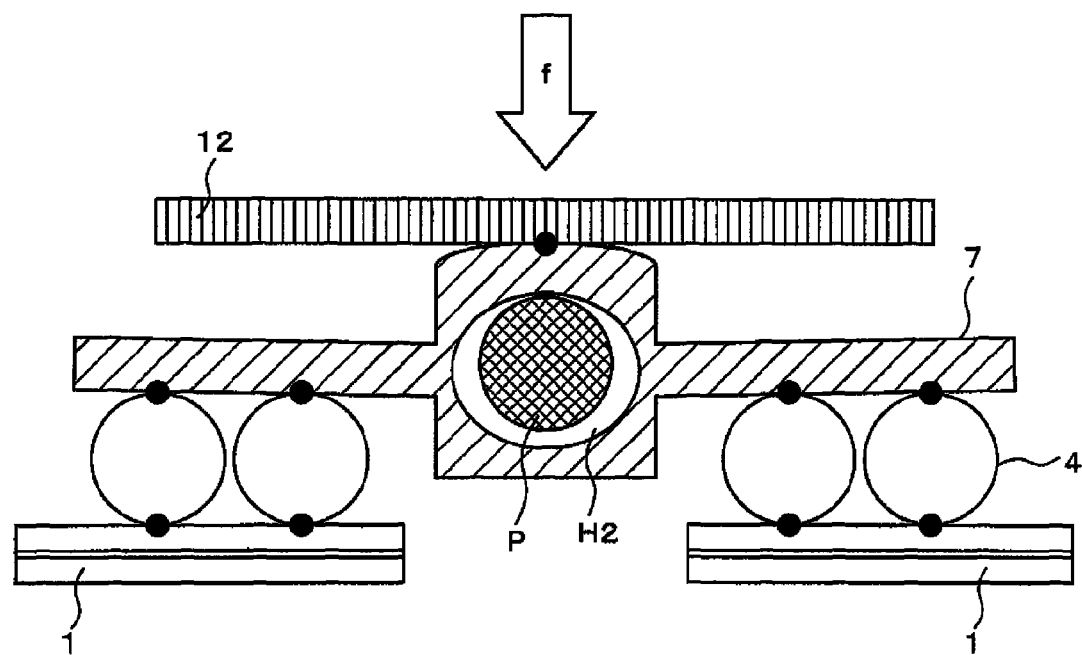
FIG. 22 is a conceptual diagram showing a modified example of the penetrating hole in the optical connecting structure of the present invention.

In addition, in the pressing member supporting member in the present invention, it is preferable that a cross section of the through hole H2 be circular from the viewpoint of workability, movability, etc., and moreover, the cross section may be other shapes such as elliptical, etc., as shown in FIG. 22.

Figure 23:
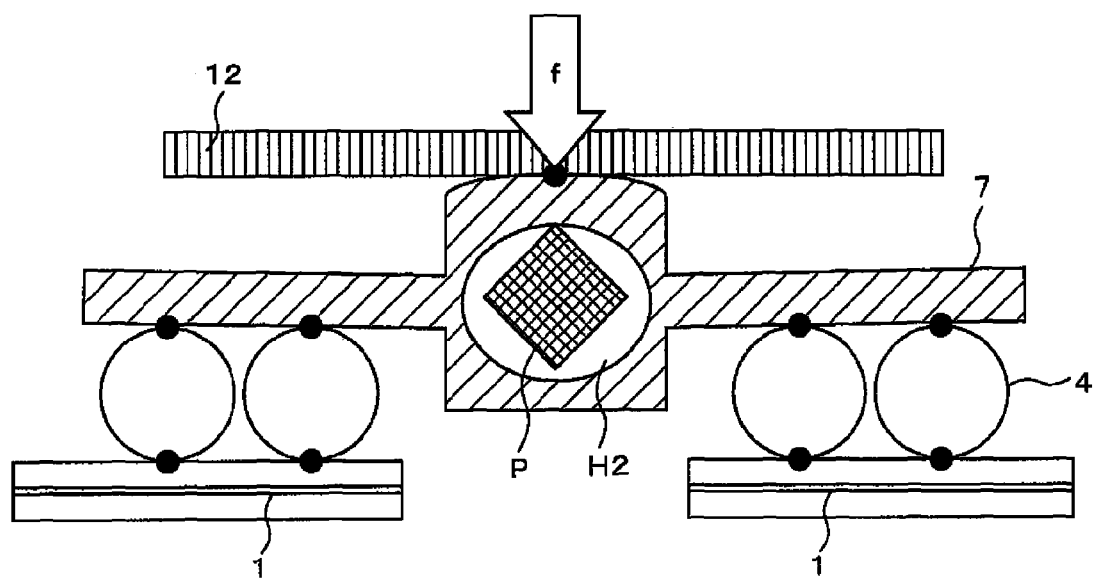
FIG. 23 is a conceptual diagram showing a modified example of the supporting rod in the optical connecting structure of the present invention.
Figure 24:
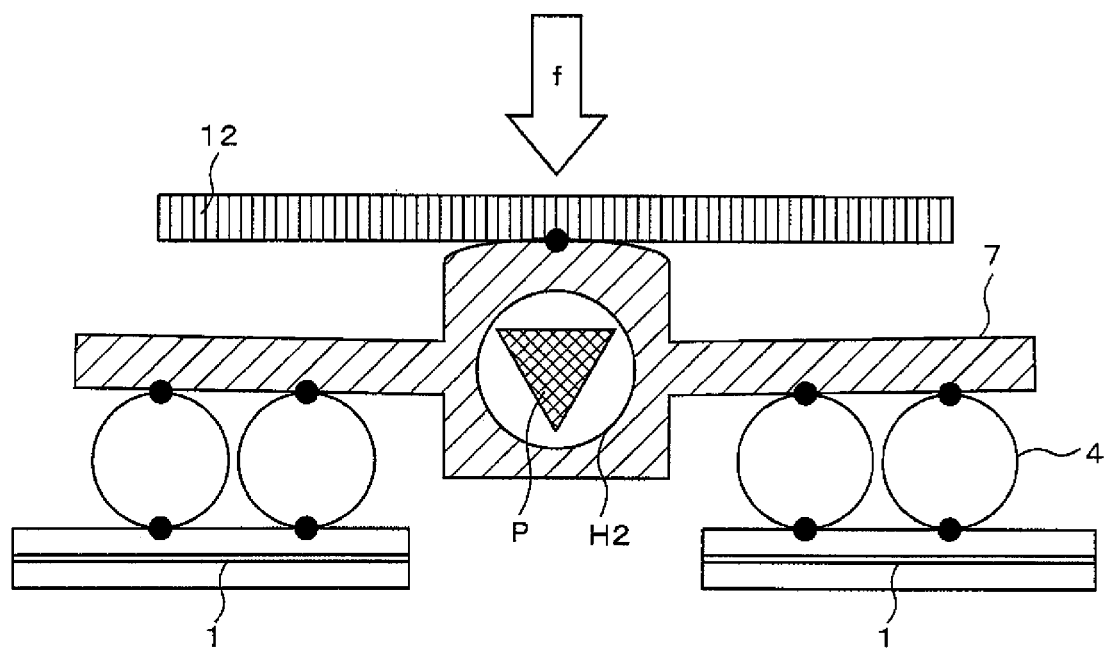
FIG. 24 is a conceptual diagram showing a modified example of the supporting rod in the optical connecting structure of the present invention.
Figure 25A:
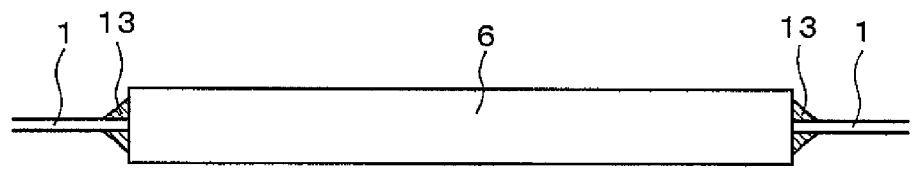
FIG. 25 is a front view showing an example in which the optical fiber is fixed at both edge parts of the package member in the optical connecting structure of the present invention.
Figure 25B:
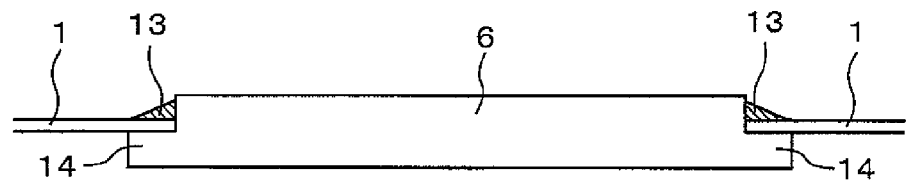
Figure 25C:
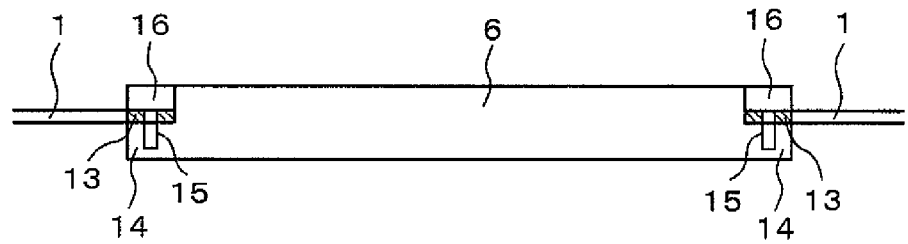
Figure 25D:
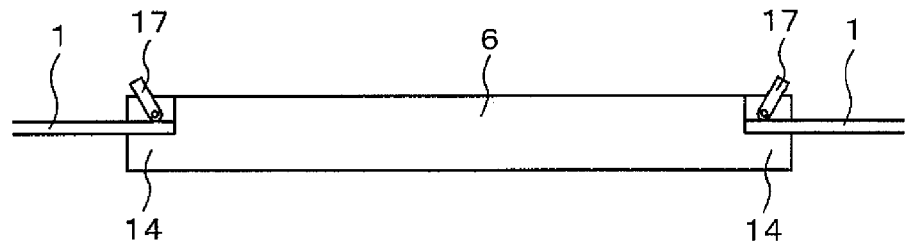

Furthermore, in the present invention, it is preferable that a cross section of the supporting bar P be circular from the viewpoint of workability, movability, etc., and moreover, the cross section may be that of a polygon such as an ellipse, triangle, quadrangle, etc., as shown in FIGS. 23 and 24. In any case, it is preferable that the supporting bar function as a supporting point for giving weak constraining force to the pressing member when the optical fiber is inserted and removed.

In the present invention, it is preferable that the optical fiber holding groove and the supporting bar be arranged through the package member so as to maintain the relative positional relationship. That is, in the case in which the optical fiber is inserted and removed by removing the clipping member or by releasing pressure using a well-known method as described in Patent Reference 8, etc., when the pressing member supporting member maximally moves upward, as shown in FIG. 14, the pressing member supporting member can be moved like a seesaw by a line contact site as a supporting point, thereby giving weak constraining force so as to properly correct upwardly flotation of the optical fiber to be inserted. Therefore, it is preferable that it have a function which automatically guides an edge of the optical fiber in a suitable optical fiber holding groove direction, even if the optical fiber is inserted with low accuracy like in a manual operation.

In addition, when a package is assembled using the optical fiber connecting structure, internal stress is generated by thermal expansion coefficients differences due to there being different members in the optical member such as a package member, an optical waveguide, etc., the above optical fiber movable structure can be prevented from increasing loss generated by moving an edge of the optical fiber, or from breaking an end surface of the optical fiber. Conventional optical modules that connect optical fibers comprise members made of materials having similar thermal expansion coefficients to that of the optical waveguide, which often uses an inorganic substrate of glass, silicon, etc., as a package material. As a result, alternatives for the package material decrease, the package is expensive, and a simple package is prevented from being realized.

Furthermore, the package member and the pressing member supporting member in the present invention can be made of various materials, and in particular, it is preferable that they be made of plastic material from the viewpoint of weight reduction, and reduction in the number of components. Additionally, it is preferable that they be made of materials having small linear expansion coefficients such as PPS (polyphenylsulfide), PEEK (polyetheretherketone), etc., from the viewpoint of heat resistance.

In addition, in the present invention, according to both sleeves of one beam structure being like a seesaw, in which one pressing member supporting member presses also the pressing members which press the optical fibers at both ends of the optical member, the nearest pressing member to the optical member of the pressing members can be pressed at the largest pressure by strain of the beam, and an effect which increases a position accuracy at an edge of the optical fiber can be anticipated. Additionally, an effect due to dispersion of the diameter of the pressing member is eased, desired dimensional accuracy of the pressing member can be loosened, and production costs of the parts can be reduced.

Furthermore, in the optical fiber connecting structure, in order to ensure the connection of the optical fiber and the optical member, it is preferable that the optical fiber 1 be fixed to the package member 6 by adhesive 13, as shown in FIG. 25(*a*), and it is more preferable that notches 14 for applying the adhesive 13 be formed at both ends of the package member 6, as shown in FIG. 25(*b*). Additionally, the package member 6 in the present invention comprises notch 14 with holes 15 at both ends, as shown in FIG. 25(*c*), and the optical fiber is positioned and is pressed and fixed by inserting fixing member 16 with protrusion in the hole 15. Furthermore, the package member 6 in the present invention comprises cam mechanisms 17 at both ends, as shown in FIG. 25(*d*), and the optical fiber 1 is pressed and fixed by the cam mechanism 17.

In addition, the optical connecting structure can be used as an optical module by permanently adhering the optical fiber, the optical fiber holding groove, and the package member. In this case, pressure can be released by removing the clipping member. As a result, optical characteristics due to the pressure can be prevented from changing. However, in the case in which materials of the adhesive, package member, the optical member, etc., differ, specific structures are affected by ambient temperature, ambient humidity, etc., due to thermal expansion coefficient differences between the materials, and connection loss reversely changes. Therefore, usability of the clipping member should be judged overall in consideration of a degree of the changing.

Furthermore, a preferable aspect of an optical connecting method according to the present invention in which an optical fiber is connected with an optical connection structure comprising an optical member which comprises optical fiber holding grooves which form optical fiber stopper structures at the outside of both ends, and which is arranged in the optical fiber stopper structure, a pressing member having a circular cross section, and a pressing member supporting member and a package member so as to sandwich the pressing member and the optical member, wherein the pressing member is arranged at right angles to the optical fiber holding groove, wherein the method comprises a step for pressing a top surface of the optical fiber in a bottom direction of the optical fiber holding groove, moving the optical fiber along the optical fiber holding groove in an axial direction of the optical fiber, and inserting the optical fiber to the optical fiber stopper structure, and a step for sandwiching the package member and the pressing member supporting member by the clipping member and further increasing pressure to the pressing member.

According to the optical connecting method of the present invention, in particular, in the case in which the optical member is an optical waveguide, etc., a passive packaging can be realized by omitting an optical fiber packaging process which consumes time and effort and is a so-called active packaging, in which an optimum optical fiber packaging position is determined and the optical fiber is fixed while measuring monitored light output optical signals which pass through the optical fiber via the optical connecting structure conventionally, and packaging of an optical fiber of the pigtail type of optical fiber module is realized.

Figure 26:
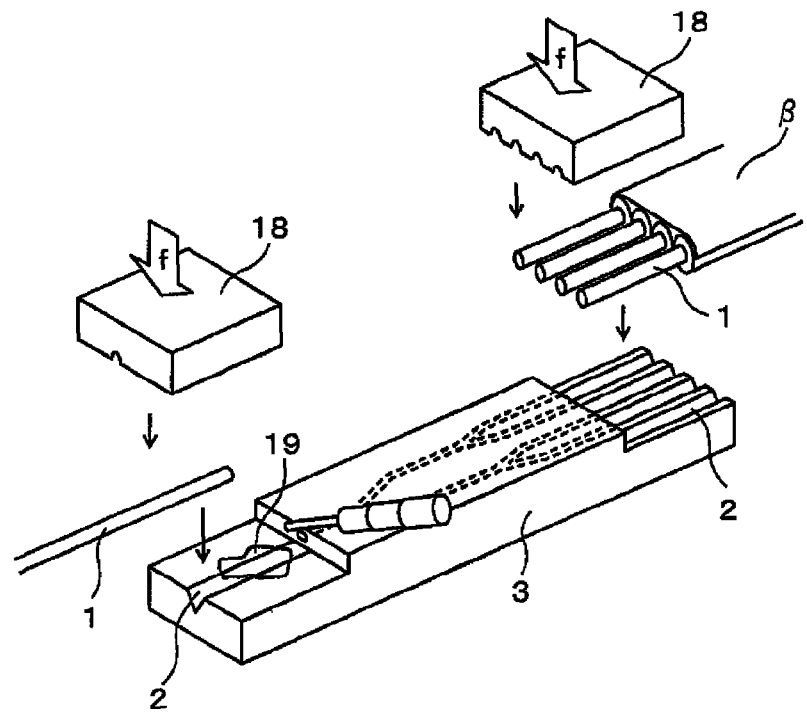
FIG. 26 is an exploded perspective view showing an optical fiber mounted body having conventional structure.
Figure 27:
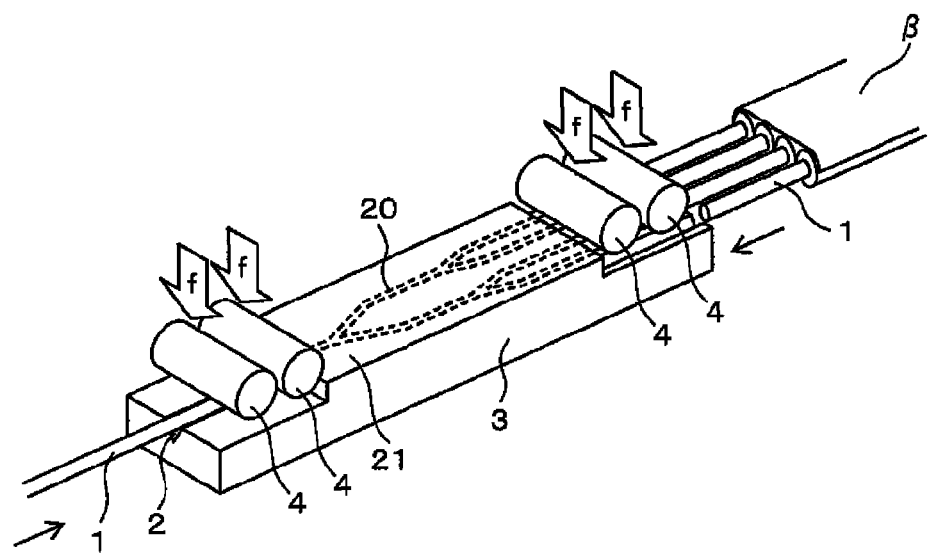
FIG. 27 is an exploded perspective view showing the optical fiber mounted body having the optical connecting structure of the present invention.

The passive packaging was able to be realized by using an optical waveguide with an optical fiber holding groove disclosed in Patent Reference 3, as shown in FIG. 26. In this case, a highly accurate part such as a glass lid, etc., is necessary, and moreover, it is necessary that, in general, the packaging be carried out while observing using equipment such as a microscope, etc., when the optical fiber is arranged in the optical fiber holding groove, and therefore, there were problems in that the cost of the equipment was increased and the packaging took a long time. Therefore, since the optical fiber is inserted in an axial direction of the optical fiber, not from upward of the optical fiber holding groove, while guiding by a structure of the pressing member and the optical fiber holding groove, as shown in FIG. 27, the optical connecting method of the present invention does not necessary follow that an edge of the optical fiber is packaged while observing using a microscope, etc. Consequently, production costs can be reduced by decreasing equipment costs, and in the construction field of the optical fiber network, etc., the optical fiber and the optical waveguide can be connected by assembly in the field. Field assembly of the optical waveguide can be carried out in the same manner as in a conventional method in which the optical fibers are connected and fixed by a technique, the so-called mechanical splicing.

EXAMPLES

Next, the optical connecting structure of the present invention is further explained by way of Examples.

1. Preparation of Optical Connecting Structure

Example 1

On one 4×40 mm surface of a package member made of PEEK (poly ether ether ketone) of 4×4×40 mm, a groove for containing an optical fiber having a width of 1.1 mm×length of 10 mm×depth of 2 mm, a groove for containing an optical waveguide having a V groove having a width of 1.5 mm×length of 20.0 mm×depth of 3 mm and a groove for containing optical fiber having a width of 0.3 mm×length of 10 mm×depth of 2 mm were serially formed. Next, a groove for containing a pressing member having a width of 1.5 mm×length of 3 mm×depth of 2 mm was formed so that the groove for the pressing member can be perpendicular to the V groove and the upper surface of the area of the V groove of the optical waveguide come to the bottom surface of the groove for pressing body, when the optical waveguide having the V groove was contained in this groove for the optical waveguide.

Next, an optical waveguide for two-way splitter (equal division) whose two ends are unified with a V groove having a length of 2 mm, was inserted into the groove for containing the optical waveguide having the V groove. After that, two pieces for each, totally four pieces of a pressing member made of stainless steel having a diameter of 0.7 mm and a length of 2.5 mm were arranged in the groove for the pressing member. The pressing member supporting member made of PEEK was arranged so as to support the stainless steel pressing member, from upward of the optical waveguide having the V groove on which the stainless steel pressing member was placed.

Then, a single core optical fiber α and a four-core tape core wire β were prepared. The single core optical fiber α is a fiber having an outer diameter of 250 μm, in which a bare optical fiber of quartz having an outer diameter of 125 μm is coated by a resin. It should be noted that the quartz bare optical fiber includes a quartz core and a quartz cladding. The four-core tape core wire β is a fiber in which single core optical fibers β1, β2, β3 and β4 similar to the single core optical fiber α are aligned, and each one surface is coated by resin. The resin of the top of each of the single core optical fiber α and the four-core tape core wire β was removed by a hot stripper to expose the bare quartz optical fiber, and the fibers were cut so that the length of the exposed part was 9 mm.

The single core optical fiber α was inserted into the V groove of root side of the division. When the fiber was contacted to the stainless steel pressing member, this pressing member was hung up, the single core optical fiber α was slid into the gap between the bottom part of the pressing member and the V groove to further insert the fiber to contact the optical waveguide, and the optical fiber and the optical waveguide were aligned and connected. Furthermore, the four-core tape core wire β was also inserted into the V groove of the top side of the division (four cores simultaneously). When the fiber was contacted to the stainless steel pressing member, this pressing member was hung up, the single core optical fiber α was slid into the gap between the bottom part of the pressing member and the V groove to further insert the fiber to contact the optical waveguide, and the optical fiber and the optical waveguide were aligned and connected. It should be noted that two central fibers (β2 and β3) were dummy fibers in Example 1. After that, the pressing member supporting member and the bottom of the package member were clipped and pressed by the stainless steel clip shaped member, and the single core optical fiber α and the tape core wire β were adhered and fixed by UV-curable adhesive at both edges of the package member, and thus the optical connecting structure of Example 1 was prepared.

Example 2

The optical connecting structure of Example 2 was produced in a manner similar to that of Example 1, except that a penetrating hole H1 having a diameter of 0.7 mm was formed at a central part of the package member, a penetrating hole H2 having a diameter of 0.75 mm was formed, the package member, the optical waveguide, the pressing member, and the pressing member supporting member were combined in advance, and a stainless steel supporting rod having a length of 4 mm and a diameter of 0.7 mm was inserted into the penetrating holes H1 and H2 to unify the optical connecting structure.

Example 3

The optical connecting structure of Example 3 was produced in a manner similar to that of Example 2, except that the size of the groove for containing the optical waveguide having the V groove and the groove for containing the optical fiber were formed with a width of 0.9 mm×length of 8.2 mm×depth of 2.0 mm and width of 0.5 mm×length of 15.9 mm×depth of 1.8 mm, respectively, and the following optical waveguide having a V groove, pressing member, and optical fiber was used, the pressing member supporting member and the bottom part of the package member were clipped by the clip shaped member, the optical fiber was not adhered by adhesive, and a matching oil was dropped at the edge part of the optical waveguide.

Figure 28:
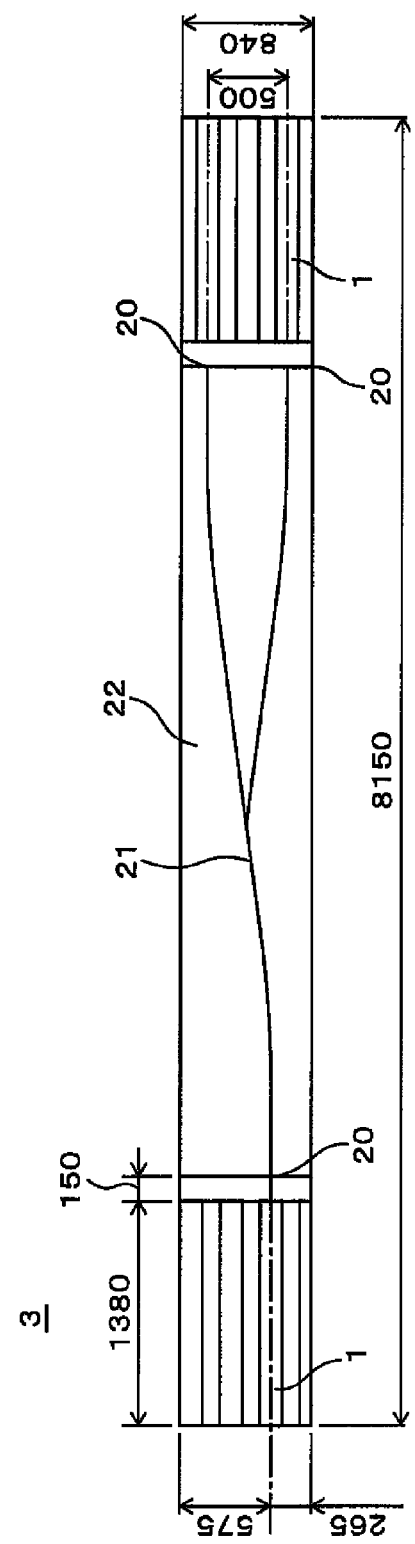
FIG. 28 is a conceptual diagram showing the V groove integrated optical waveguide substrate for a branching splitter (power monitor).
Figure 29:
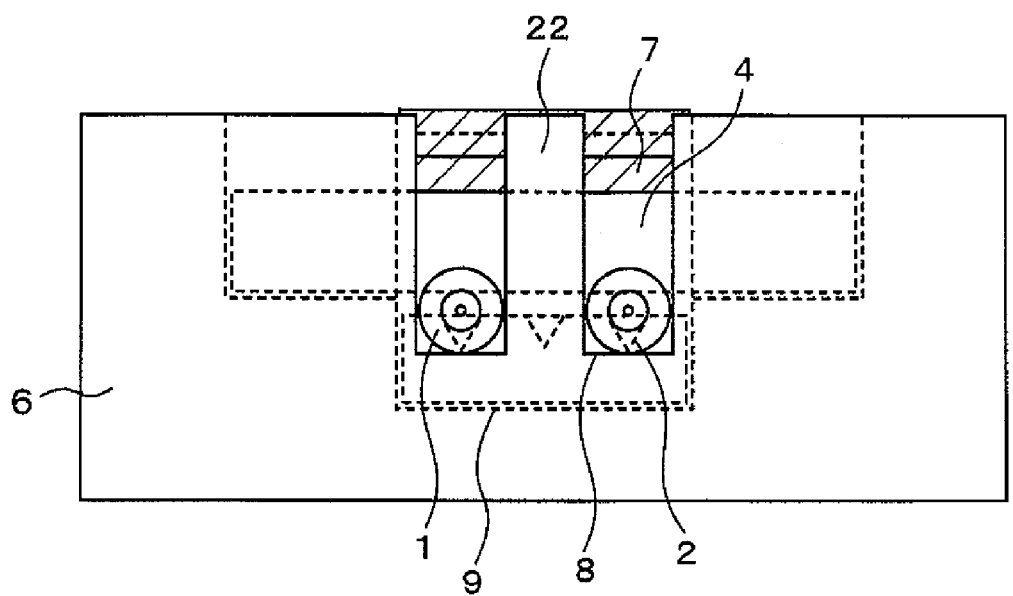
FIG. 29 is a conceptual diagram showing an example in which the dividing wall is arranged in the optical fiber containing groove in the optical connecting structure of the present invention.

As the optical waveguide having the V groove mentioned above, a branching splitter (power monitor) shown in FIG. 28 was used. This splitter is designed so that a low loss of not more than 1 dB is obtained in a 1 channel side (a port of the upper right in FIG. 28), and a high loss of about 45 dB is obtained in a 2 channel side for monitoring (a port of the lower right in FIG. 28). As the pressing member, two cylindrical bodies made of stainless steel having a diameter of 0.5 mm×length of 2.5 mm were arranged for each optical fiber of both edges of the optical waveguide (four cylindrical bodies in total). As the optical fiber, using a total of three single core optical fibers α, each fiber was inserted into a port of the optical waveguide. At that time, at a side where two optical fibers were inserted (right side of FIG. 28), a dividing wall 22 was arranged at a groove of the package member for containing the optical fiber as shown in FIG. 29, so that two grooves for the port were divided.

Example 4

Figure 30:
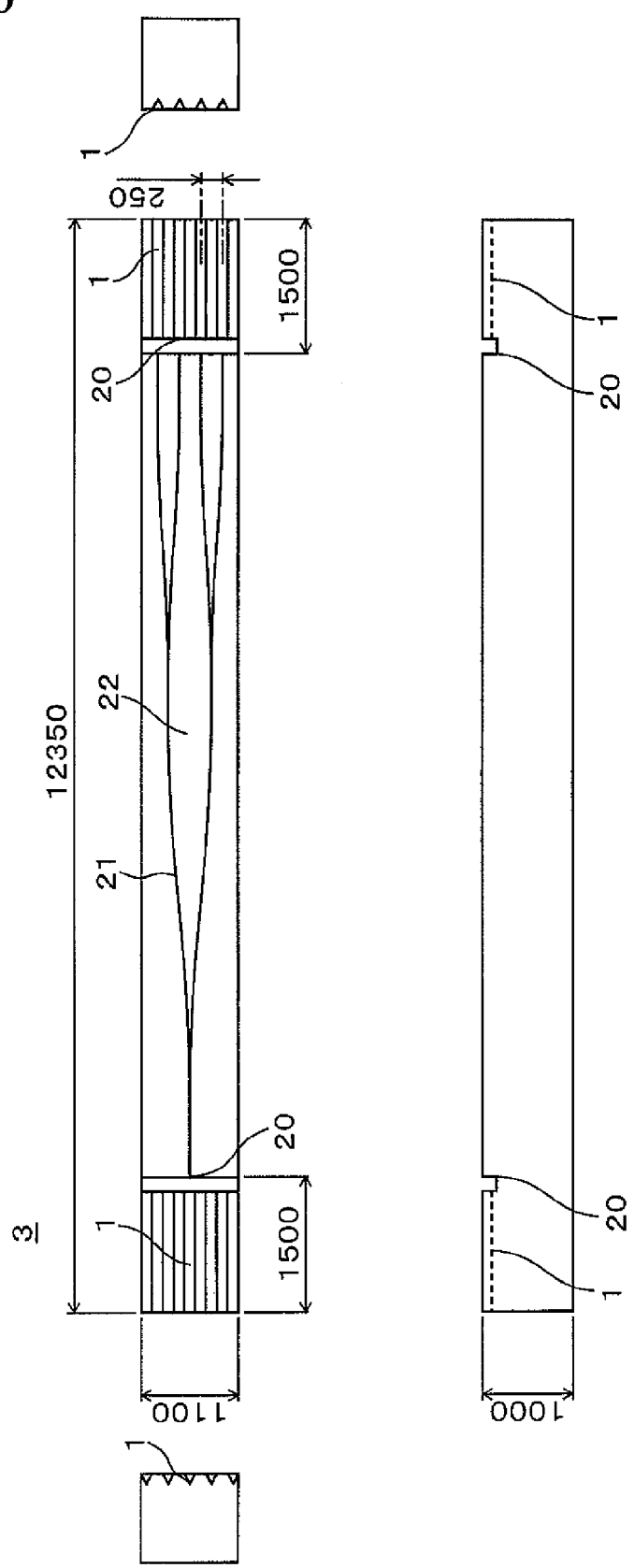
FIG. 30 is a conceptual diagram showing the V groove integrated optical waveguide substrate for four-way splitter (equal division).

The optical connecting structure of Example 4 was produced in a manner similar to that of Example 2, except that the size of the groove for containing the optical waveguide substrate having a V groove and the size of the groove for containing the optical fiber are formed into a width of 1.2 mm×length of 12.4 mm×depth of 2.8 mm and width of 2.1 mm×length of 13.8 mm×depth of 1.8 mm, respectively, and the following optical waveguide having a V groove, pressing member, and optical fiber was used. As the optical waveguide having V groove, the four-way splitter (equal division) shown in FIG. 30 was used. As the pressing member, two cylindrical bodies made of stainless steel having a diameter of 0.5 mm×length of 2.5 mm were arranged for each optical fiber of both edges of the optical waveguide (four cylindrical bodies in total). As the optical fiber, a three core tape core wire γ and a four core tape core wire β were used, each wire was inserted into a V groove of the left side and the right side shown in FIG. 30. It should be noted that the three-core tape core wire γ is a fiber in which single core optical fibers γ1, γ2 and γ3 similar to the single core optical fiber a are aligned and each one surface is coated by a resin, and that the outer two fibers (γ2 and γ3) were dummy fibers in Example 4.

Comparative Example 1

The optical connecting structure of Comparative Example 1 was produced in a manner similar to that of Example 1, except that the stainless steel pressing member was not used, and the optical fiber mounting having a conventional structure shown in FIG. 26 was performed.

Comparative Example 2

The optical connecting structure of Comparative Example 2 was produced in a manner similar to that of Example 3 except that the stainless steel pressing member was not used, and the optical fiber mounting having a conventional structure shown in FIG. 26 was performed.

Comparative Example 3

The optical connecting structure of Comparative Example 3 was produced in a manner similar to that of Example 4, except that the stainless steel pressing member was not used, and an optical fiber mounting having a conventional structure shown in FIG. 26 was performed.

2. Testing

Regarding the optical connecting structures of Examples 1 and 2 and Comparative Example 1 produced as mentioned above, the insertion loss and the return loss were compared, while providing the fusion connecting of single core optical fibers with each other as a standard. The wavelength of measurement was 1550 nm. As a result, in Examples 1 and 2, the insertion loss of connection of the single core optical fiber α and the single core optical fiber β1 was 3.5 dB and the insertion loss of connection of the single core optical fiber α and the single core optical fiber β4 was 3.8 dB. On the other hand, in Comparative Example 1, the insertion loss of connection of the single core optical fiber α and the single core optical fiber β1 was 4.1 dB and the insertion loss of connection of the single core optical fiber α and the single core optical fiber β4 was 5.0 dB. From these results, the optical connecting structure of the present invention is demonstrated to be an extremely superior optical connecting structure. It should be noted that the ideal value of the insertion loss for two-way division is 3.0 dB, even though it is desirable that the value of the insertion loss be lower. In the present invention, superior efficiency of not more than 0.8 dB, as an excess loss, was observed considering the ideal value mentioned above.

Figure 31:
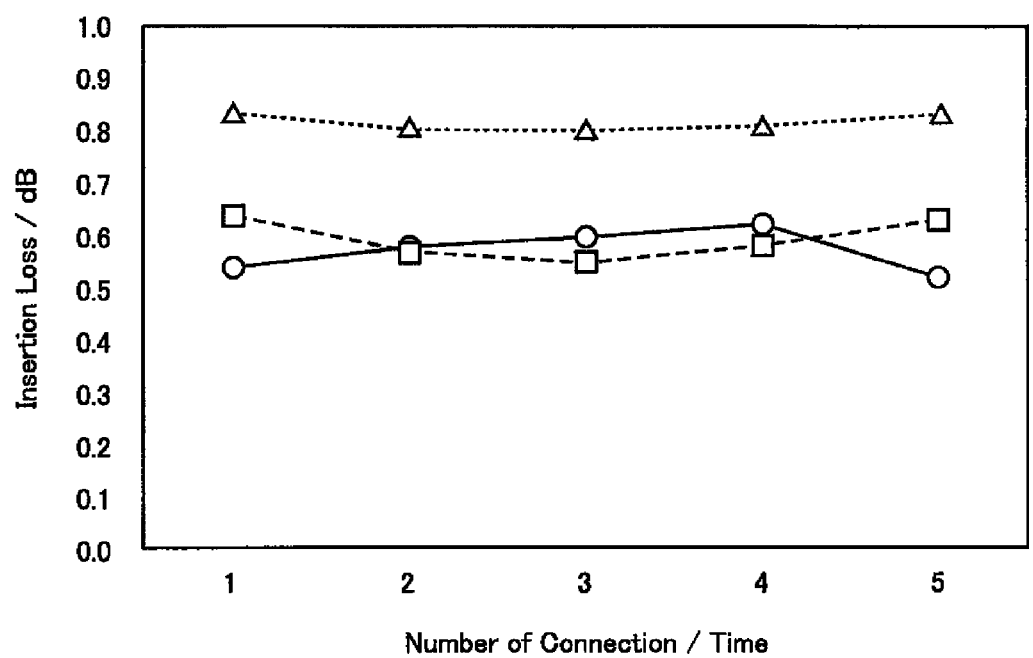
FIG. 31 is a graph showing the insertion loss of the branching splitter (power monitor) module.
Figure 32:
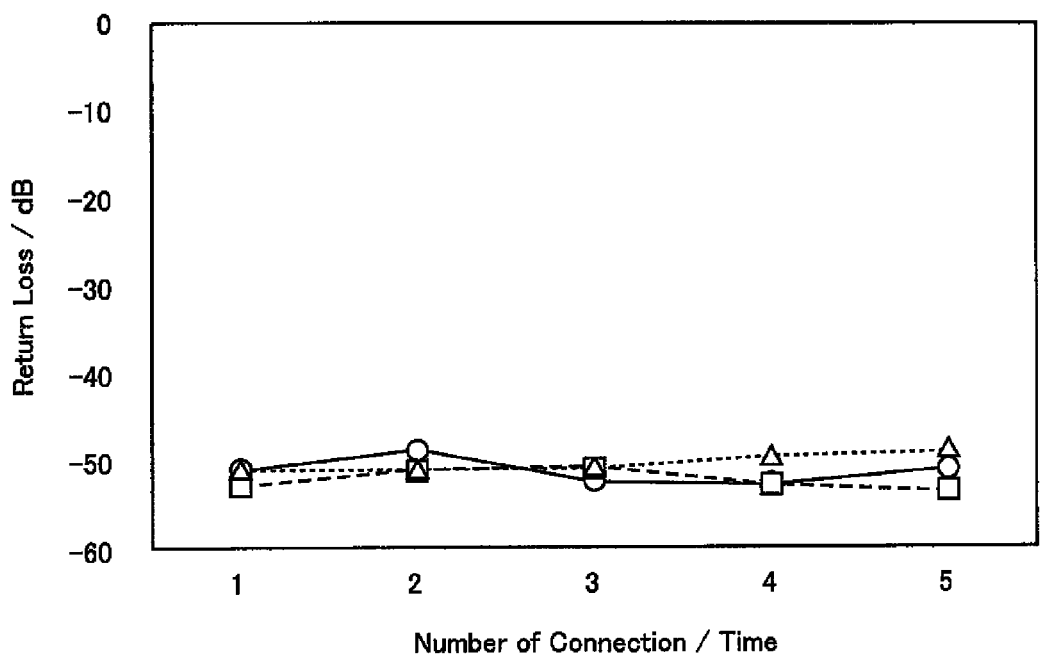
FIG. 32 is a graph showing the return loss of the branching splitter (power monitor) module.

Next, regarding the optical connecting structure of Example 3 and Comparative Example 2, after the clip shaped member was removed, the optical fiber was removed. Then, the optical fiber was inserted again, the clip shaped member was attached, and the insertion loss and the return loss of the 1 channel side were measured. The wavelength of measurement was 1550 nm. This process of removing and inserting of the optical fiber was repeated five times, and the insertion loss and the return loss at each time were measured. The result of measurement of the insertion loss is shown in FIG. 31, and the result of measurement of the return loss is shown in FIG. 32. It should be noted that in each figure, a result in which three optical waveguides having similar construction were used is shown. From these results, it was demonstrated that good repeatability in which ups and downs are not observed after inserting five times and removing can be obtained in the optical connecting structure of the present invention. On the other hand, the insertion loss of the optical connecting structure of Comparative Example 2 was not more than 1.0 dB, as mentioned above. From the viewpoint that the insertion loss of the present invention evaluated in Example 3 (FIG. 31) was not more than 0.9 dB, efficiency of the optical waveguide can be obtained in a similar or greater extent, compared to the conventional optical fiber mounting, in the optical connecting structure of the present invention. The structure of the optical connecting structure of the present invention is so facilitated that the optical connecting structure of the present invention can be utilized in a use substituting a conventional package structure.

Furthermore, regarding the optical connecting structure of Example 4 and Comparative Example 3, the insertion loss was compared, while providing the fusion connecting of single core optical fibers with each other as a standard. The wavelength of measurement was 1550 nm. As a result, each insertion loss of 4 channels was 7.3 dB, 6.6 dB, 7.8 dB, and 7.5 dB. The average was 7.3 dB, and uniformity which is a difference of ports of maximal loss and minimal loss was 1.1 dB, which is a good result. In addition, in the optical connecting structure of Example 4, regarding insertion of the optical fiber, the insertion of a tape core wire could be performed more smoothly than the insertion of a single core wire. It is considered that insertion of a single core optical fiber was not smooth since the pressing member was slightly inclined to apply a slight force along the x direction, not only along y direction, in the case in which the single core fiber was used. On the other hand, the insertion loss of the optical connecting structure of Comparative Example 3 was not more than 7.8 dB. From the viewpoint that the ideal loss of four-way division corresponds to about 6 dB in the present invention, as shown in Example 4, excessive loss was not more than 1.5 dB, and therefore, sufficiently low loss values can be obtained in the present invention so as to be practical.

What is claimed is:

1. An optical connecting structure comprising:
    an optical fiber;
    a pressing member having circular outer cross section;
    an optical member;
    a package member; and
    a pressing member supporting member,
    wherein the package member and the pressing member supporting member clip the optical connecting structure,
    wherein the optical member comprises:
        an optical element;
        an optical fiber stopper structure; and
        an optical fiber holding groove,
        wherein the optical fiber stopper structure is positioned between the optical element and the optical fiber holding groove,
    wherein the optical fiber is inserted along the optical fiber holding groove so as to contact with the optical fiber stopper structure,
    wherein the pressing member is arranged on the optical fiber holding groove mutually perpendicular, the pressing member presses the upper surface of the optical fiber to a direction of a bottom of the optical fiber holding groove, and the optical fiber and the optical element are thereby optically connected, and
    wherein the package member and the pressing member supporting member have a penetrating hole, and they are unified by inserting a supporting rod into the penetrating hole.

2. The optical connecting structure according to claim 1, wherein the cross section of the optical fiber holding groove is one selected from the shape of the letter V, an inverted trapezoid, and concave,
    wherein the optical fiber and the optical fiber holding groove is contacted with each other in two lines, and
    wherein the optical fiber and the pressing member are contacted with each other at a point.

3. The optical connecting structure according to claim 1, wherein the optical element is at least one optical element selected from an optical waveguide, optical lens, optical crystal, and optical filter.

4. The optical connecting structure according to claim 1, wherein an optical fiber stopper structure is arranged at the optical member so that a gap exists between optical input and output part of the optical fiber and the optical element.

5. The optical connecting structure according to claim 1, wherein a refractive index matching agent consisting of a liquid, gel, or noncrystalline solid exists in the gap between the optical fiber and the optical element.

6. The optical connecting structure according to claim 1, wherein the optical fiber is movable on the optical fiber holding groove along the axial direction of the optical fiber, when the fiber is not pressed in the direction of a bottom of the optical fiber holding groove by the pressing member.

7. The optical connecting structure according to claim 1, wherein plural pressing members are arranged.

8. The optical connecting structure according to claim 1, wherein the package member and the pressing member supporting member are formed by a plastic material.

9. The optical connecting structure according to claim 1, wherein the inner diameter of the penetrating hole is larger than the outer diameter of the supporting rod, and the pressing member supporting member is thereby movable along the perpendicular direction, up-down and left-right, to the axial direction of the supporting rod.

10. The optical connecting structure according to claim 1, wherein the package member has a cam mechanism at both edge parts thereof, and the cam mechanism presses and fixes the optical fiber.

11. An optical connecting structure comprising:
an optical fiber;
a pressing member having circular outer cross section;
an optical member;
a package member; and
a pressing member supporting member,
wherein the package member and the pressing member supporting member clip the optical connecting structure,
wherein the optical member comprises:
  an optical element;
  an optical fiber stopper structure; and
  an optical fiber holding groove,
    wherein the optical fiber stopper structure is positioned between the optical element and the optical fiber holding groove,
wherein the optical fiber is inserted along the optical fiber holding groove so as to contact with the optical fiber stopper structure,
wherein the pressing member is arranged on the optical fiber holding groove mutually perpendicular, the pressing member presses the upper surface of the optical fiber to a direction of a bottom of the optical fiber holding groove, and the optical fiber and the optical element are thereby optically connected, and
wherein the package member and the pressing member supporting member are clipped by a clip-shaped member.

12. An optical connecting structure comprising:
an optical fiber;
a pressing member having circular outer cross section;
an optical member;
a package member; and
a pressing member supporting member,
wherein the package member and the pressing member supporting member clip the optical connecting structure,
wherein the optical fiber is fixed to the package member with an adhesive,
wherein the optical member comprises:
  an optical element;
  an optical fiber stopper structure; and
  an optical fiber holding groove,
    wherein the optical fiber stopper structure is positioned between the optical element and the optical fiber holding groove,
wherein the optical fiber is inserted along the optical fiber holding groove so as to contact with the optical fiber stopper structure,
wherein the pressing member is arranged on the optical fiber holding groove mutually perpendicular, the pressing member presses the upper surface of the optical fiber to a direction of a bottom of the optical fiber holding groove, and the optical fiber and the optical element are thereby optically connected, and
wherein the package member has cut parts to coat an adhesive, at both edge parts thereof.

13. An optical connecting structure comprising:
an optical fiber;
a pressing member having circular outer cross section;
an optical member;
a package member; and
a pressing member supporting member,
wherein the package member and the pressing member supporting member clip the optical connecting structure,
wherein the optical fiber is fixed to the package member with an adhesive,
wherein the optical member comprises:
  an optical element;
  an optical fiber stopper structure; and
  an optical fiber holding groove,
    wherein the optical fiber stopper structure is positioned between the optical element and the optical fiber holding groove,
wherein the optical fiber is inserted along the optical fiber holding groove so as to contact with the optical fiber stopper structure,
wherein the pressing member is arranged on the optical fiber holding groove mutually perpendicular, the pressing member presses the upper surface of the optical fiber to a direction of a bottom of the optical fiber holding groove, and the optical fiber and the optical element are thereby optically connected,
wherein the package member has cut parts consisting of a hole at both edge parts thereof, and
wherein a fixing member having projection is inserted into the hole to align the optical fiber, and the optical fiber is thereby pressed and fixed.

* * * * *